(12) United States Patent
Ishiguro et al.

(10) Patent No.: US 9,050,942 B2
(45) Date of Patent: Jun. 9, 2015

(54) AIRBAG APPARATUS

(71) Applicant: TOYODA GOSEI CO., LTD, Kiyosu-shi, Aichi-ken (JP)

(72) Inventors: Naohiko Ishiguro, Kiyosu (JP); Hitoshi Iida, Kiyosu (JP); Mikine Hayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 13/962,034

(22) Filed: Aug. 8, 2013

(65) Prior Publication Data

US 2014/0062071 A1 Mar. 6, 2014

(30) Foreign Application Priority Data

Aug. 29, 2012 (JP) ................. 2012-189108

(51) Int. Cl.
*B60R 21/239* (2006.01)
*B60R 21/2338* (2011.01)
*B60R 21/203* (2006.01)

(52) U.S. Cl.
CPC ..... *B60R 21/239* (2013.01); *B60R 2021/23382* (2013.01); *B60R 2021/2395* (2013.01); *B60R 21/203* (2013.01)

(58) Field of Classification Search
CPC ................ B60R 21/239; B60R 21/203; B60R 2021/239; B60R 2021/23382; B60R 2021/2395; B60R 2021/23384; B60R 2021/2338
USPC ...................... 280/739, 743.2, 731
See application file for complete search history.

(56) References Cited

U.S. PATENT DOCUMENTS

| 2005/0098991 A1 | 5/2005 | Nagai et al. |
| 2006/0151979 A1 | 7/2006 | DePottey et al. |
| 2008/0265552 A1 | 10/2008 | Nagai et al. |
| 2012/0068444 A1* | 3/2012 | Suzuki et al. ................. 280/739 |

FOREIGN PATENT DOCUMENTS

| EP | 2 048 040 A1 | 4/2009 |
| JP | 2005-199987 A | 7/2005 |
| JP | 2012-061982 A | 3/2012 |
| JP | 2012-61982 A | 3/2012 |

OTHER PUBLICATIONS

Extended European Search Report dated Nov. 15, 2013 in corresponding EP application No. 13180709.1-1503.

* cited by examiner

*Primary Examiner* — Keith Frisby
(74) *Attorney, Agent, or Firm* — Posz Law Group, PLC

(57) ABSTRACT

An airbag of an airbag apparatus includes a vent mechanism. The vent mechanism includes a vent hole, a belt member including a cover portion for covering the vent hole and two connecting sections extending from both sides of the cover portion and serving as tethers, an outer panel located on an outer side of the cover portion, an inner panel located on an inner side of the cover portion and provided with an inner opening. The vent hole is formed on the outer panel. The connecting sections are run through the guide section so as to move toward the vent hole and let the cover portion loosen and open the vent hole when an occupant side wall of the airbag catches an occupant and moves toward a vehicle body side wall. The guide section also holds the connecting sections such that the connecting sections serve as the tethers.

2 Claims, 21 Drawing Sheets

AIRBAG APPARATUS

CROSS REFERENCE TO RELATED APPLICATIONS

The Present application claims priority from Japanese Patent Application No. 2012-189108 of Ishiguro et al., filed on Aug. 29, 2012, the disclosure of which is hereby incorporated into the present application by reference.

BACKGROUND OF THE INVENTION

1. Field of the Invention

The present invention relates to an airbag apparatus mountable on a vehicle. More particularly, the invention relates to an airbag apparatus in which a vent hole of an airbag is covered by a cover portion, which is continuous with a tether that controls a clearance between a vehicle body side wall and an occupant side wall of the airbag at inflation, and the vent hole is opened when the cover portion loosens along with loosening of the tether when the airbag cushions an occupant, and an inflation gas is exhausted from the opened vent hole.

2. Description of Related Art

JP 2012-061982 A discloses a known airbag apparatus with a vent mechanism for preventing undue elevation of airbag pressure, in which a vent hole is opened with the aid of loosening of a tether. In the airbag apparatus, an airbag is so inflatable as to separate a vehicle body side wall deployable toward a vehicle body structure and an occupant side wall deployable toward an occupant, and includes a tether that connects the vehicle body side wall and the occupant side wall for controlling a clearance between the vehicle body side wall and the occupant side wall at airbag inflation. The vent hole is formed on the part of the vehicle body side wall and a cover portion, which is formed continuously with the tether, covers the vent hole. The cover portion loosens and opens the vent hole when the occupant side wall catches an occupant and moves toward the vehicle body side wall, thereby exhausting an inflation gas.

More specifically, in the above airbag, an inner panel with an inner opening is located on an inner surface of the vehicle body side wall, at the location of the vent hole. The cover portion continuous with the tether is located between the vent hole and the inner panel. The first end of the tether on the side of the cover portion is joined to the vehicle body side wall whereas the second end of the tether away from the cover portion is joined to the occupant side wall. The inner panel covers an inner surface of the cover portion and joined to the vehicle body side wall by its opposite edges in a width direction of the cover portion. The inner opening is located at the center of the inner panel so as to allow an internal pressure of the airbag to act on the cover portion.

With this vent mechanism, when the occupant side wall catches an occupant at airbag inflation and moves toward the vehicle body side wall, the tether loosens, and the cover portion receives an internal pressure of the airbag through the inner opening of the inner panel and loosens outwardly in such a manner as to pass through the vent hole, and then slips out of a space between the inner opening and vent hole, thereby opening the vent hole. Thus an inflation gas is released from the vent hole.

However, in the conventional airbag apparatus, when the cover portion loosens and opens the vent hole, the cover portion passes through the vent hole only for the loosening amount of the only one tether extending from a part of the cover portion not joined to the vehicle body side wall.

In other words, the height of the cover portion which has slipped out of the vent hole is only half of a distance that the occupant side wall moves toward the vehicle body side wall. This is not enough to open the vent hole sufficiently and release an inflation gas quickly.

SUMMARY OF THE INVENTION

An object of the present invention is to provide an airbag apparatus that is capable of exhausting an inflation gas quickly despite of the configuration that a vent hole is opened with the aid of loosening of a tether.

An airbag apparatus of the invention includes an airbag that is so inflatable as to separate a vehicle body side wall which is deployable toward a vehicle body structure and an occupant side wall which is deployable toward an occupant. The airbag further includes a tether that connects the vehicle body side wall and the occupant side wall for controlling a clearance between the vehicle body side wall and the occupant side wall at airbag inflation, a vent mechanism that includes a vent hole formed on the part of the vehicle body side wall of the airbag and a cover portion which is formed continuously with the tether and covers the vent hole. The cover portion loosens and opens the vent hole to release an inflation gas when the occupant side wall catches an occupant and moves toward the vehicle body side wall.

The vent mechanism further includes a belt member, an outer panel, an inner panel and a guide section. The belt member is comprised of the cover portion and two connecting sections extending from opposite sides of the cover portion and connected to the occupant side wall. The connecting sections function as the tether for controlling a clearance between a vicinity of the vent hole and joints of the connecting sections to the occupant side wall at airbag inflation. The outer panel is located on an outer side of the cover portion. The vent hole is formed on the outer panel. The inner panel is located on an inner side of the cover portion and provided with an inner opening which allows an internal pressure of the airbag to act on the cover portion therethrough. The two connecting sections are run through the guide section in such a manner as to be movable toward the vent hole in order to allow the cover portion to loosen and open the vent hole when the occupant side wall catches an occupant and moves toward the vehicle body side wall. The guide section also holds the connecting sections such that the connecting sections function as the tether at airbag inflation.

With the airbag apparatus of the present invention, when the occupant side wall catches an occupant and moves toward the vehicle body side wall at airbag inflation, the connecting sections serving as the tethers loosen. In the meantime, the cover portion receives an internal pressure of the airbag through the inner opening of the inner panel and loosens outwardly in such a manner as to pass through the vent hole, and then slips out of a space between the inner opening and vent hole, thereby opening the vent hole. Thus an inflation gas is released from the vent hole.

When the cover portion passes through the vent hole, the two connecting sections, which extend from opposite sides of the cover portion with the aid of the guide section and are connected to the occupant side wall, move toward the vent hole along with the cover portion. That is, each of the connecting sections moves toward the vent hole and runs through the guide section for a distance that the occupant side wall comes close to the vehicle body side wall, and accordingly the height that the cover portion protrudes from the vent hole is generally equal to the distance that the occupant side wall comes close to the vehicle body side wall, and which height is generally two times of that of a conventional airbag. As a result, the present invention will enable the vent hole to open widely and release an inflation gas quickly.

Therefore, the airbag apparatus according to the invention will be capable of releasing an inflation gas quickly despite of the configuration that a vent hole is opened with the aid of loosening of a tether.

In the present invention, it is desired that the two connecting sections are arranged symmetrical about a straight line that connects the vent hole and an inlet opening of the airbag for introducing an inflation gas, as viewed from the side of the occupant side wall at full inflation of the airbag.

With this configuration, the two connecting sections are arranged in a concentric fashion about the inlet opening, and equally distant from the inlet opening. Therefore, when the occupant side wall catches an occupant and moves toward the vehicle body side wall, the two connecting sections will loosen equally and the amounts that the connecting sections move when the cover portion passes through the vent hole will be equal in a steady fashion. As a result, the opening fashion of the vent hole will be steady in every airbag.

Moreover, it is desired in the present invention that a first edge in a width direction of the cover portion is connected neither to the outer panel nor to the inner panel, whereas a second edge in a width direction of the cover portion is connected at least to the inner panel.

With this configuration, the specific edge not connected to the inner panel will pass through the vent hole and open the vent hole, and therefore, the opening fashion of the vent hole will be further stabilized.

Further, the configuration that the cover portion is connected to the vehicle body side wall via the region of the inner panel by the other edge will help prevent the connecting sections from slipping through the guide section freely when the airbag is folded up, which slipping would otherwise change substantial lengths of the connecting sections. Therefore, the configuration of the present invention will help stabilize the lengths of the connecting sections projecting out of the guide section and facilitate the folding work of the airbag by fixing the location and posture of the belt member.

In the present invention, the inner panel of the vent mechanism may be a part of the vehicle body side wall. In this case, an outer peripheral edge of the outer panel is connected to an outer peripheral edge of the inner panel, i.e., to the region of the inner panel on the vehicle body side wall. The guide section includes on both sides of the inner opening each one insert opening and the guide section is comprised of a tubular region formed of the inner panel and outer panel between the two insert openings. The cover portion of the belt member is located between the outer panel and the inner panel and the two connecting sections are run through the two inner openings, respectively, so as to protrude from opposite ends of the tubular region.

This configuration will serve to reduce the number of components of the vent mechanism, because the inner panel of the vent mechanism is comprised of a part of the vehicle body side wall, which constitutes a circumferential wall of the airbag, and the tubular region serving as the guide section is also formed by the two insert openings formed on the vehicle body side wall.

Moreover, since the vent hole is formed on the outer panel that is prepared separate from the vehicle body side wall or occupant side wall, the shape of the vent hole can be easily changed without changing the inner opening on the inner panel, i.e., on the vehicle body side wall. That is, a design change of the vent hole will be easily handled by changing the outer panel, which is a small component.

Alternatively, the outer panel of the vent mechanism may be comprised of a part of the vehicle body side wall. In this case, the inner panel is connected to an inner surface of the vehicle body side wall, and opposite edges of the inner panel in a width direction of the cover portion are joined to the vehicle body side wall. The guide section is comprised of a tubular region formed by the inner panel and the outer panel between joints of the opposite edges of the inner panel to the vehicle body side wall. The cover portion of the belt member is located between the outer panel and the inner panel such that the two connecting sections protrude from opposite ends of the tubular region.

With this configuration, since the outer panel is comprised of a part of the vehicle body side wall, which constitutes a circumferential wall of the airbag, and the tubular region serving as the guide section is formed by only connecting the opposite edges of the inner panel to the vehicle body side wall. Therefore, the vent mechanism will be formed simply with reduced number of components.

In the present invention, the inner opening of the inner panel may be comprised of a plurality of through holes.

With this configuration, the flow rate and speed of an inflation gas exhausted from the vent hole will be adjustable by changing the number and/or the opening area of the through holes constituting the inner opening, without changing the contour of the vent hole, thereby giving more flexibility to pressure control of the airbag at cushioning an occupant.

The present invention may be applied to an airbag apparatus mountable on a steering wheel for protecting a driver. In this case, each of the vehicle body side wall and the occupant side wall is prepared in a generally round shape and the inlet opening is located at the center of the vehicle body side wall. The vent hole is so allocated as to be deployable in front of the inlet opening and in a space between an annular ring of the steering wheel and a boss located at a center of the steering wheel. The connecting sections are so allocated as to be deployable on the left and right sides of the cover portion. An outer edge of the cover portion, which is deployable on a front side in a width direction of the cover portion at airbag deployment, is connected neither to the outer panel nor to the inner panel, whereas an inner edge of the cover portion, which is deployable on a rear side in a width direction of the cover portion, is connected at least to the inner panel.

With this configuration, when the vent hole is opened, the outer edge of the cover portion facing away from the inlet opening will slip out of the vent hole and the cover portion will form a curving and tapering half pipe, and the tapering half pipe will be located at a space between front spokes inside the ring of the steering wheel, i.e., inside a front region of the ring. Therefore, the vent hole will exhaust an inflation gas smoothly toward a large space in the front.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
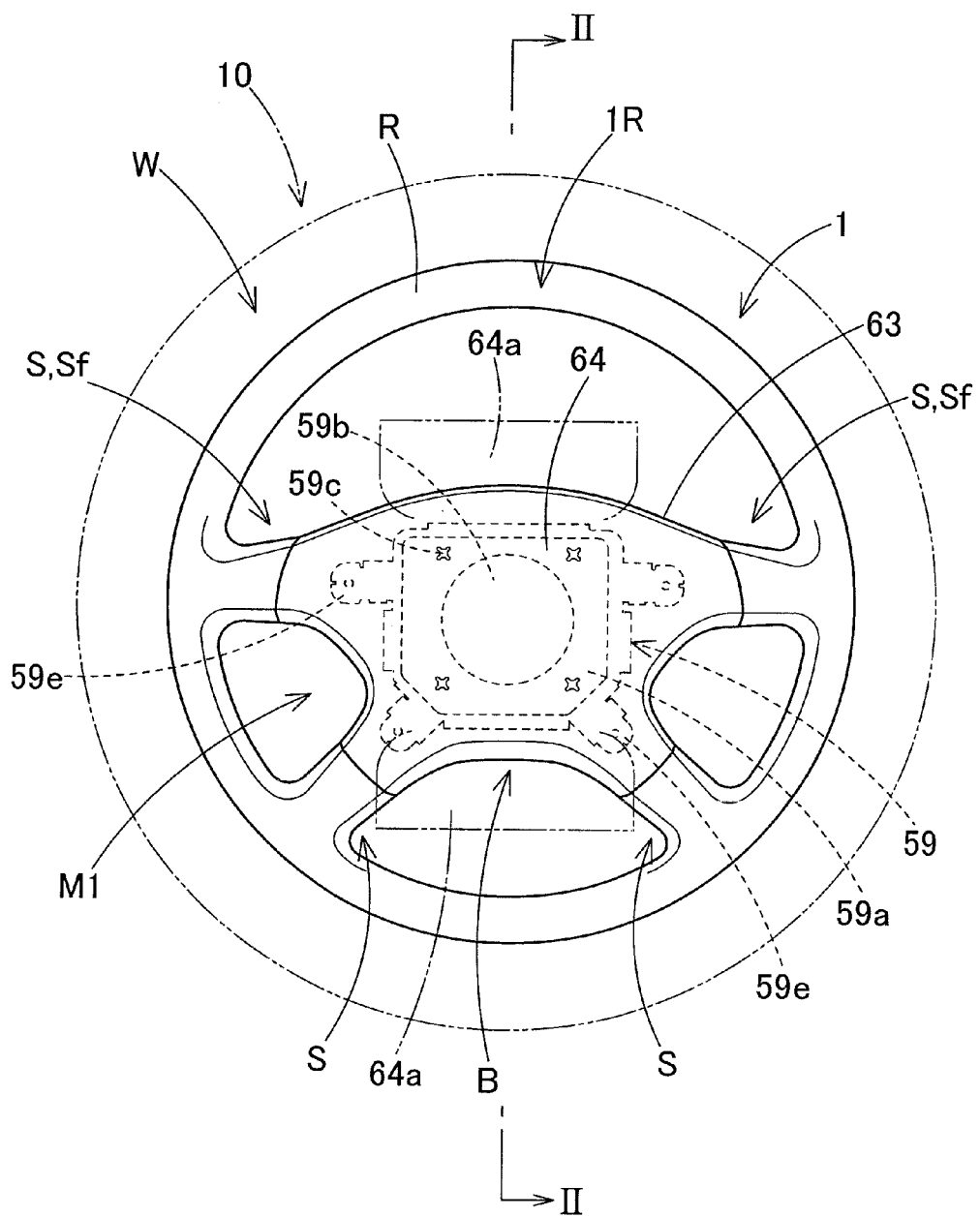
FIG. 1 is a plan view of an airbag apparatus according to the first embodiment of the invention in service.
Figure 2:
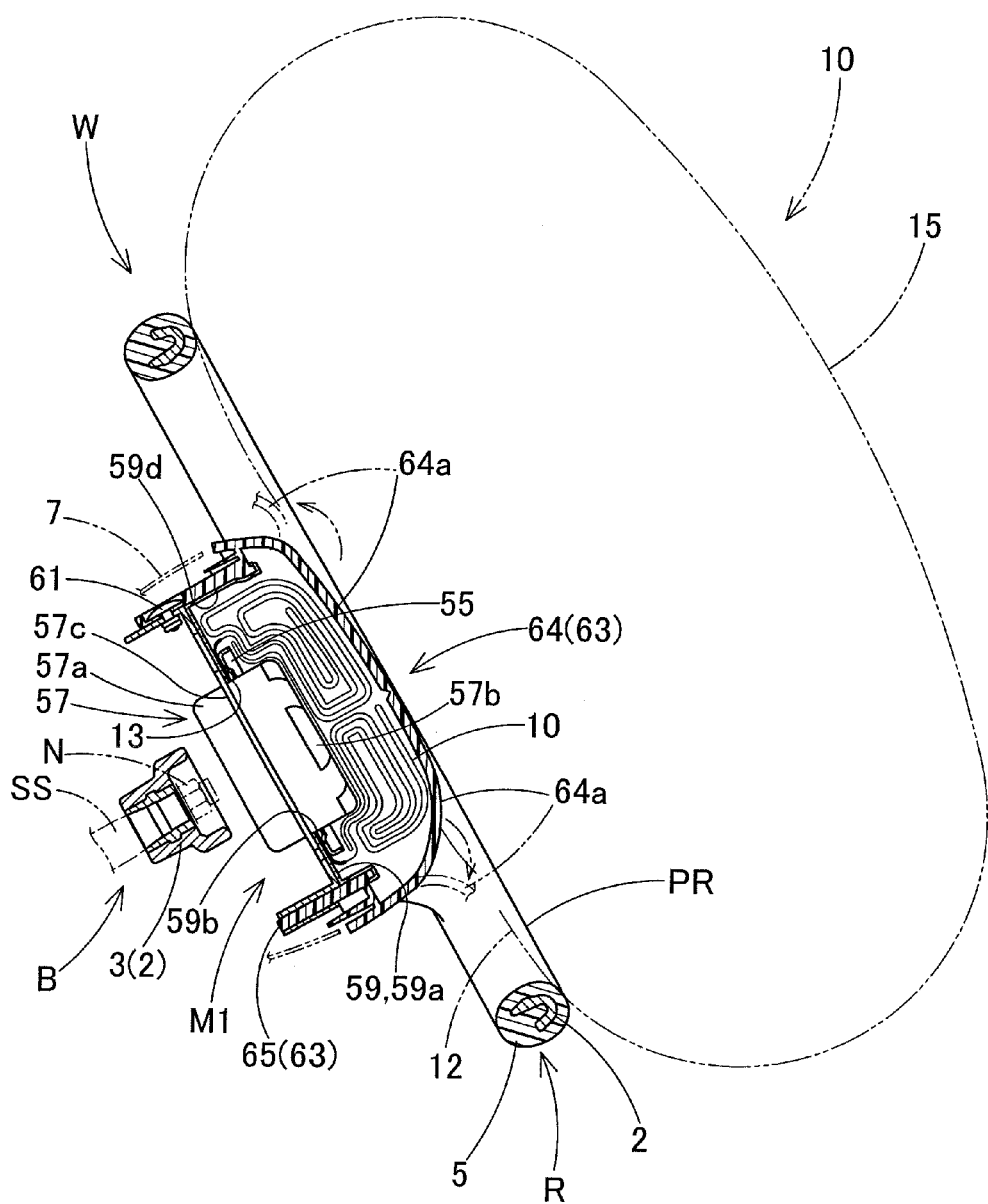
FIG. 2 is a vertical section of the airbag apparatus of FIG. 1 taken along line II-II in FIG. 1.

As shown in FIGS. 1 and 2, an airbag apparatus M1 according to a first embodiment of the present invention is mounted on a steering wheel W. The steering wheel W includes a wheel body 1 and airbag apparatus M1 disposed on top of a boss section B at the center of the wheel body 1. The wheel body 1 includes an annular ring R, a boss section B and four spokes S. The ring R is for holding at steering operation. The boss section B is disposed at the center of the ring R and is secured to a steering shaft SS. The spokes S interconnect the boss section B and the ring R.

In the description of the first embodiment, unless otherwise specified, an up and down direction corresponds to an up and down direction extending along an axial direction of the steering shaft SS. A front and rear direction corresponds to a front and rear direction extending orthogonally to an axial direction of the steering shaft SS of a vehicle being steered straight ahead, and a left and right direction corresponds to a left and right direction extending orthogonally to an axial direction of steering shaft SS of a vehicle being steered straight ahead.

As shown in FIG. 2, the steering wheel body 1 includes a core 2 of such metal as aluminum base alloy, and the core 2 has such a contour that the ring R, boss section B and spokes S are interconnected. The core 2 is covered with a covering layer 5 of synthetic resin on the ring R and regions of the spokes S adjoining the ring R. At an area of the core 2 corresponding to the boss section B is s a steel boss 3 through which the steering shaft SS is inserted and then fixed by nut N. Underneath the wheel body 1 is a lower cover 7 made from synthetic resin for covering the lower side of the boss section B.

As shown in FIG. 2, the airbag apparatus M1 includes an airbag 10, which is folded up, an inflator 57 for supplying the airbag 10 with an inflation gas, an airbag cover 63 covering an upper side of the airbag 10, a case 59 housing the airbag 10 and the inflator 57 and supporting the airbag cover 63, and a retainer 55 attaching the airbag 10 to the case 59 together with the inflator 57.

The retainer 55 has a square annular shape and holds down a peripheral area of a later-described inlet opening 13 of the airbag 10. The retainer 55 is provided at its four corners with unillustrated bolts, with which the retainer 55 mounts the airbag 10 and the inflator 57 on the case 59.

The inflator 57 includes a body 57a and a flange 57c. The inflator body 57a is columnar in shape and is provided on the upper region with a plurality of gas discharge ports 57b. The flange 57c projects from an outer circumference of the body 57a and has unillustrated through holes for receiving the unillustrated bolts of the retainer 55.

As shown in FIGS. 1 and 2, the case 59 is made of sheet metal and formed into a generally rectangular parallelepiped shape. The case 59 includes a rectangular bottom wall 59a and a side wall 59d extending upward from an outer periphery of the bottom wall 59a. The case 59 is disposed above the boss section B of the steering wheel W, and serves as a housing of the airbag 10. The bottom wall 59a is provided with a circular insert hole 59b for receiving the body 57a of the inflator 57 from the lower side. Around the insert hole 59b are four through holes 59c for receiving the bolts of the retainer 55. At the upper end of the side wall 59d are mounting sections 59e extending outwardly. Unillustrated mounting bases of an unillustrated horn switch mechanism are attached to the mounting pieces 59e, and the case 59 is secured to the core 2 of the steering wheel W with the aid of the mounting bases. As a result, the airbag apparatus M1 is mounted on top of the boss section B of the steering wheel body 1 which is attached to the steering shaft SS. Moreover, a later-described side wall 65 of the airbag cover 63 is attached to the side wall 59d of the case 59 with rivets 61 or the like.

The airbag cover 63 is fabricated of synthetic resin and includes a ceiling wall 64 covering the airbag 10 from above, and a side wall 65 having a generally square tubular shape extending downward from a vicinity of an outer periphery of the ceiling wall 64. The ceiling wall 64 includes two doors 64a which are openable forward and rearward, respectively, when pushed by the inflated airbag 10.

The airbag 10 is made of a woven fabric of polyamide, polyester or the like, and is inflatable into such a shape as is round when viewed from above and generally oval when viewed from a side, as indicated by double-dotted lines in FIGS. 1 and 2. Referring to FIGS. 2 to 5 and 8, a circumferential wall 11 of the airbag 10 is comprised of a vehicle body side wall 12, which is deployable toward the steering wheel body 1, and an occupant side wall 15, which is deployable to face a driver.

The vehicle body side wall 12 and occupant side wall 15 are formed into an identical round shape, and the vehicle body side wall 12 is provided at the center with a round inlet opening 13 for introducing an inflation gas. The circumferential wall 11 is formed by sewing the vehicle body side wall 12 and occupant side wall 15 together at the outer peripheries. Around the inlet opening 13 are formed mounting holes 14 for receiving the bolts of the retainer 55 to mount the airbag 10 on the bottom wall 59a of the case 59.

A reinforcing cloth 54 is sewn to the periphery of the inlet opening 13. The inlet opening 13 and mounting holes 14 are also formed on the reinforcing cloth 54.

The airbag 10 includes two first tethers 17 and two second tethers 18 that connect the vehicle body side wall 12 and occupant side wall 15 for controlling a clearance between the vehicle body side wall 12 and occupant side wall 15 at airbag inflation.

Figure 3:
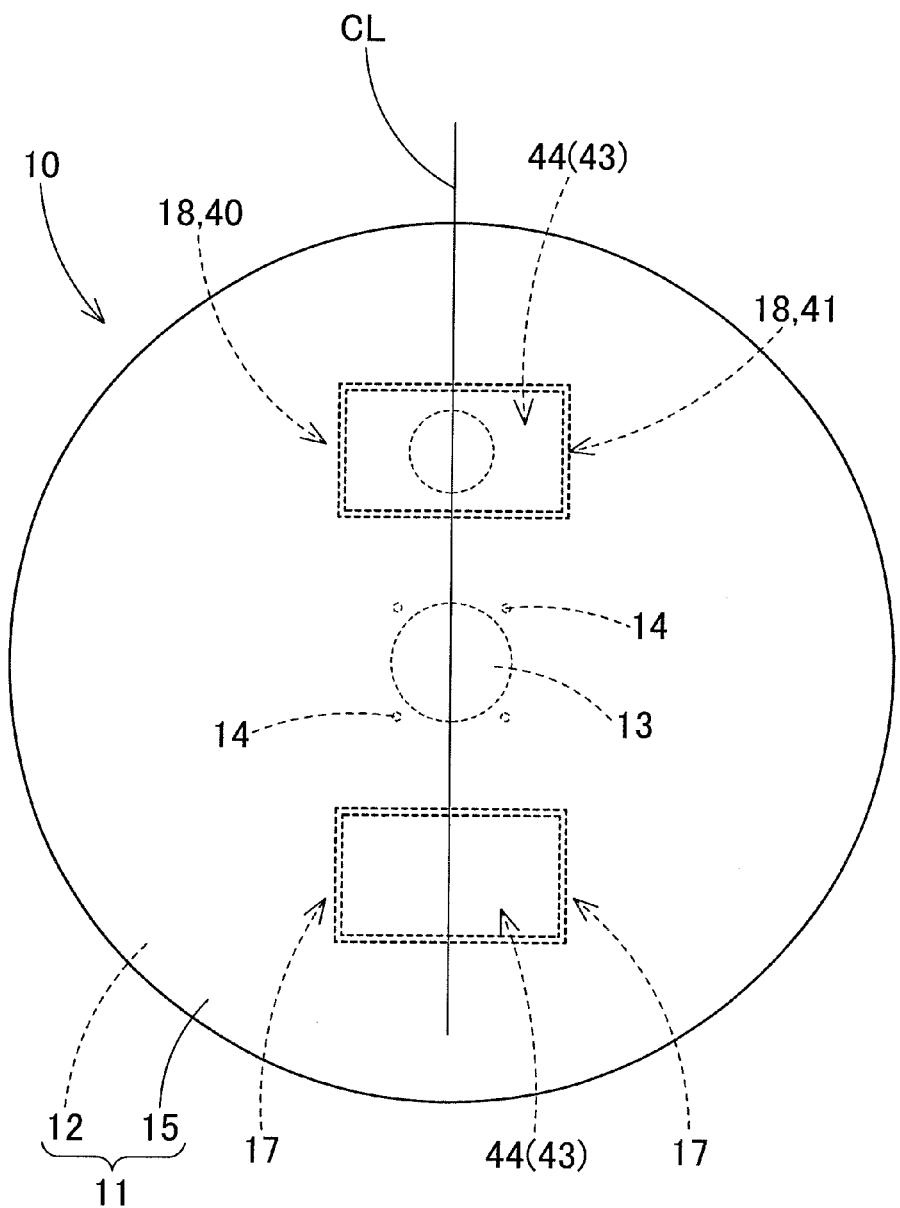
FIG. 3 is a plan view of an airbag of the first embodiment.
Figure 8:
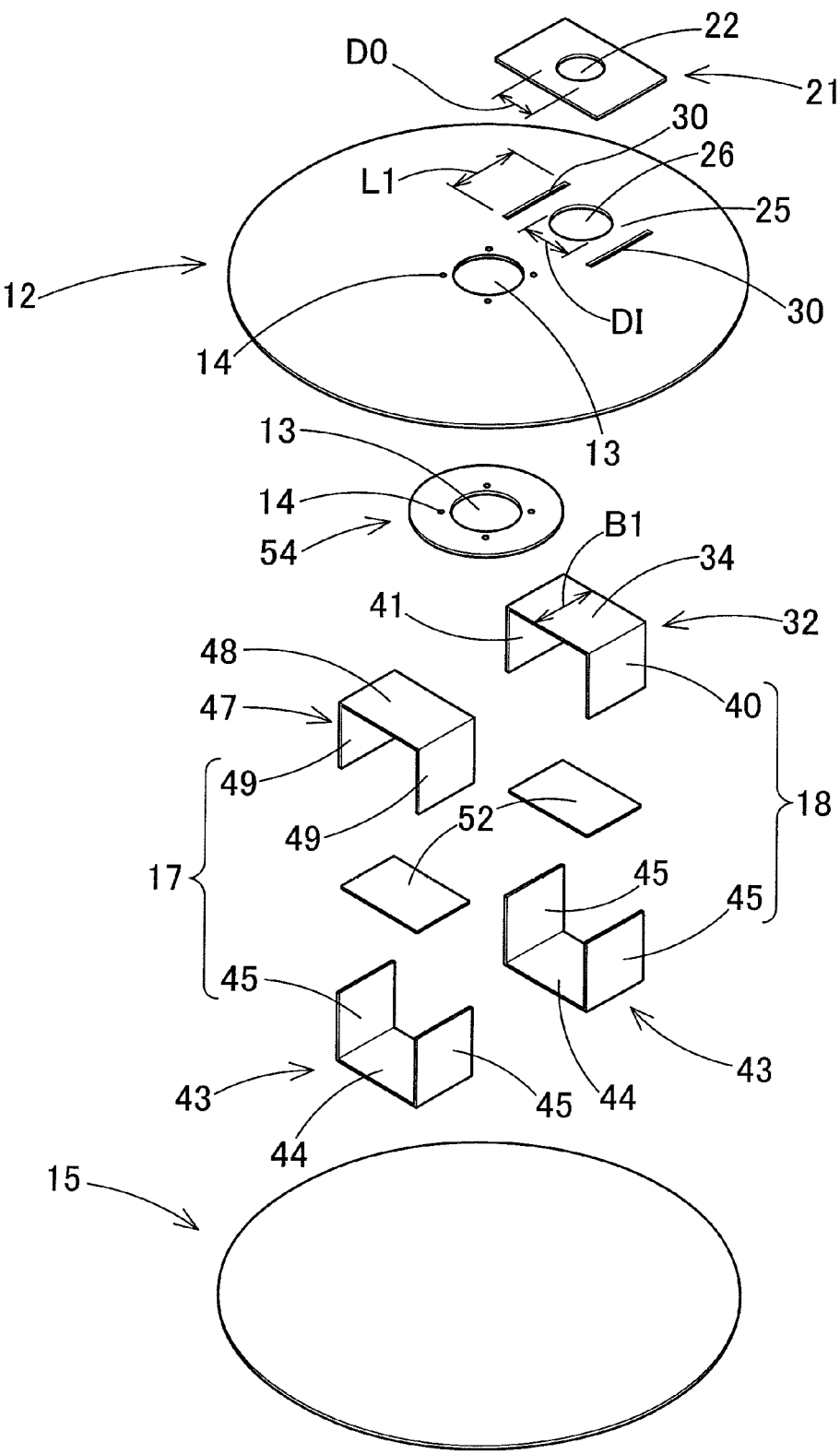
FIG. 8 schematically depicts components of the airbag of the first embodiment by perspective views.
Figure 9:
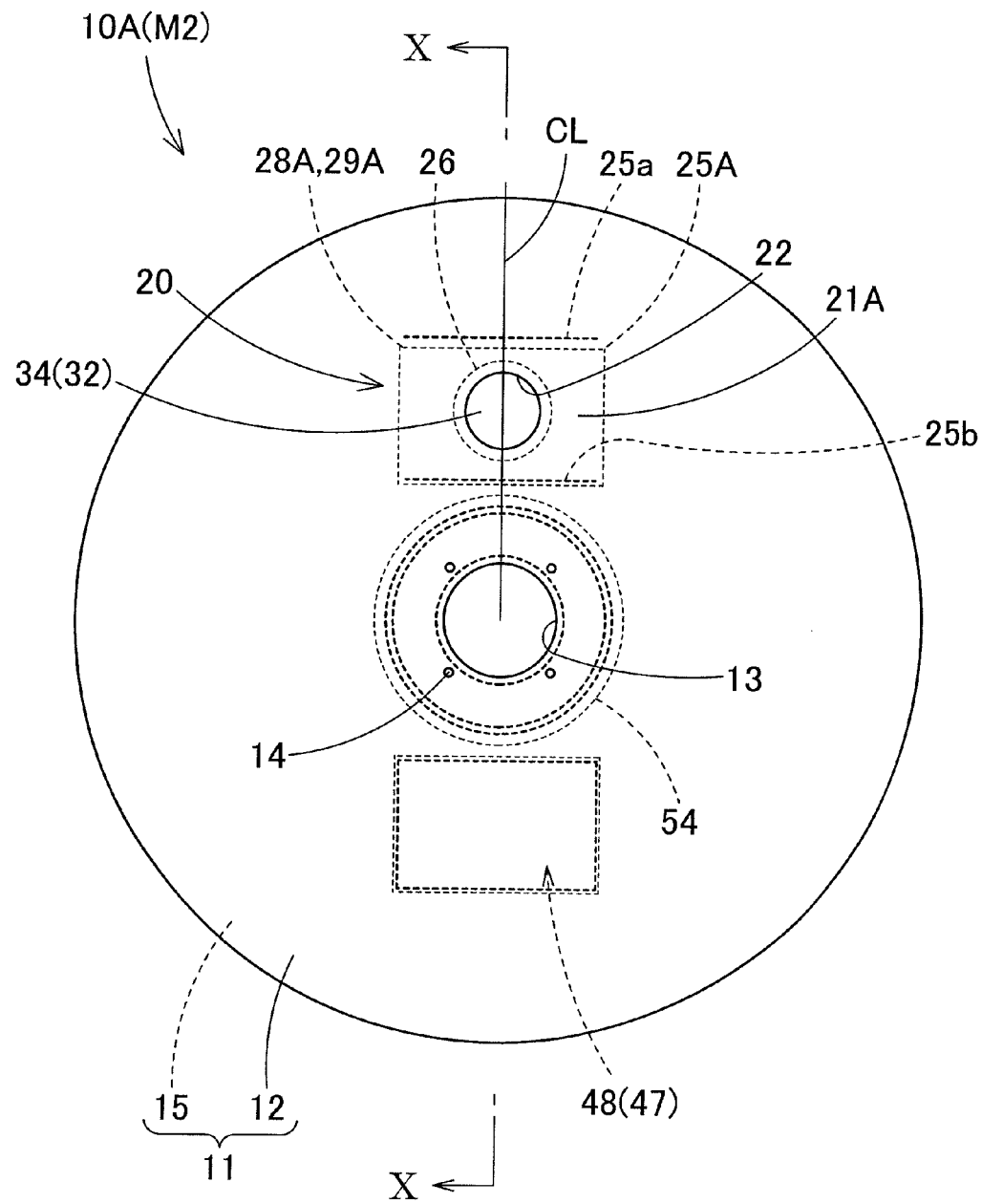
FIG. 9 is a bottom view of an airbag for use in an airbag apparatus of the second embodiment.
Figure 10:
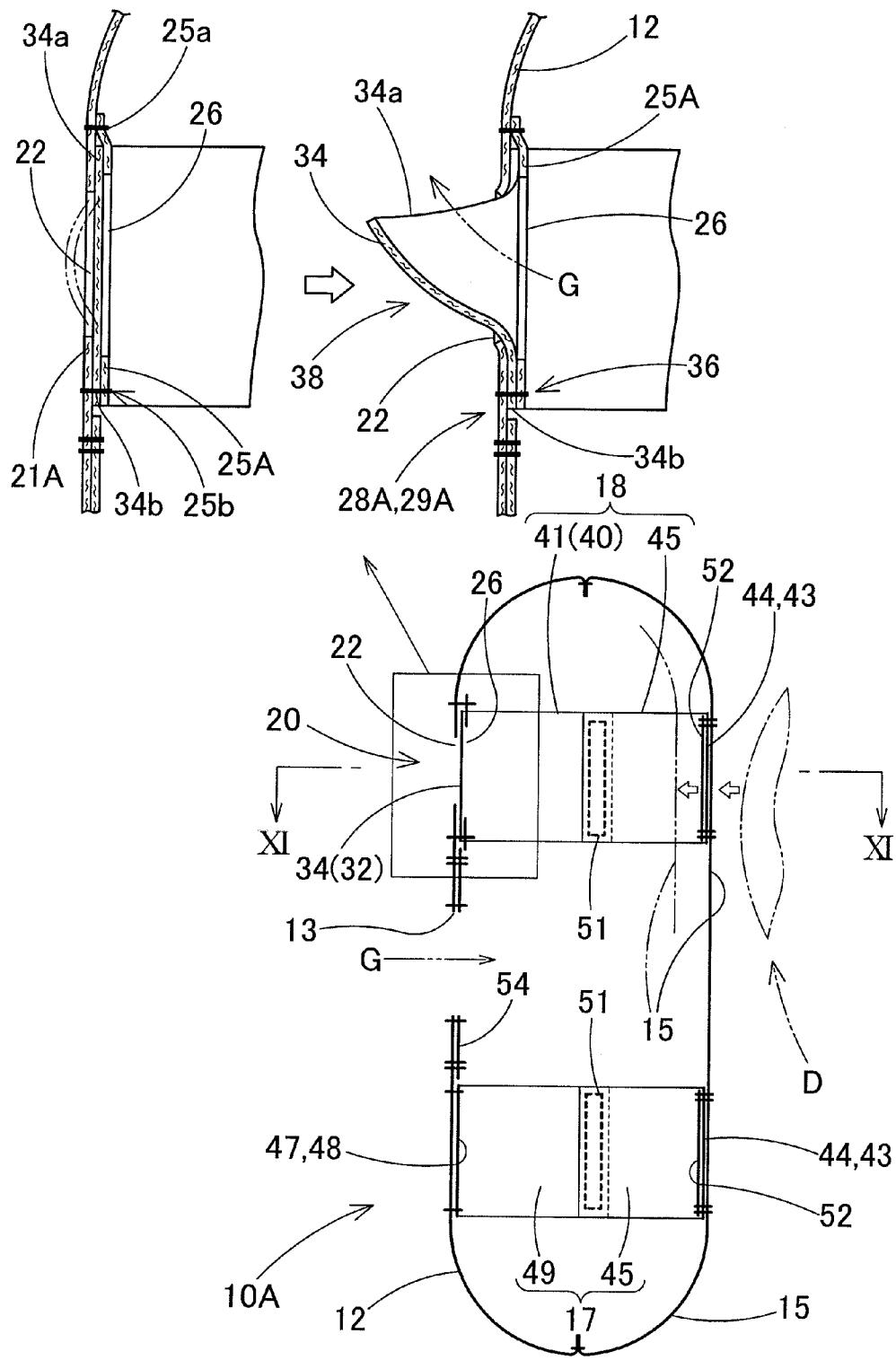
FIG. 10 is a vertical section of the airbag of FIG. 9 taken along line X-X in FIG. 9 and also shows the way a vent hole is opened.
Figure 11A:
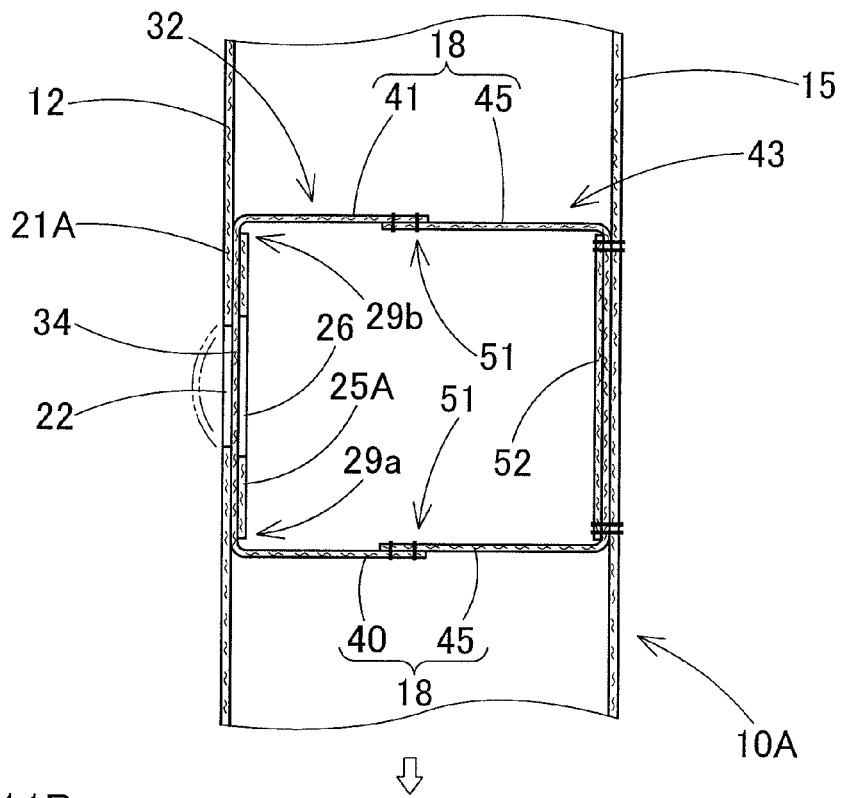
FIGS. 11A and 11B are partial sectional views of the airbag of FIG. 9 taken along line XI-XI in FIG. 10 and show the way the vent hole is opened.
Figure 11B:
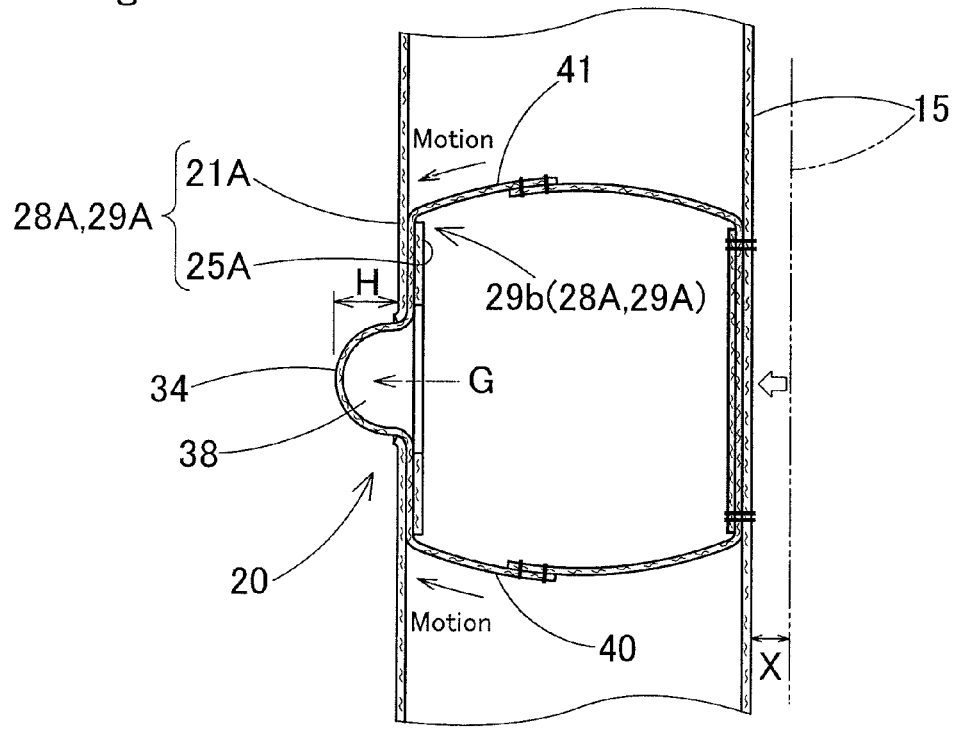
Figure 12A:
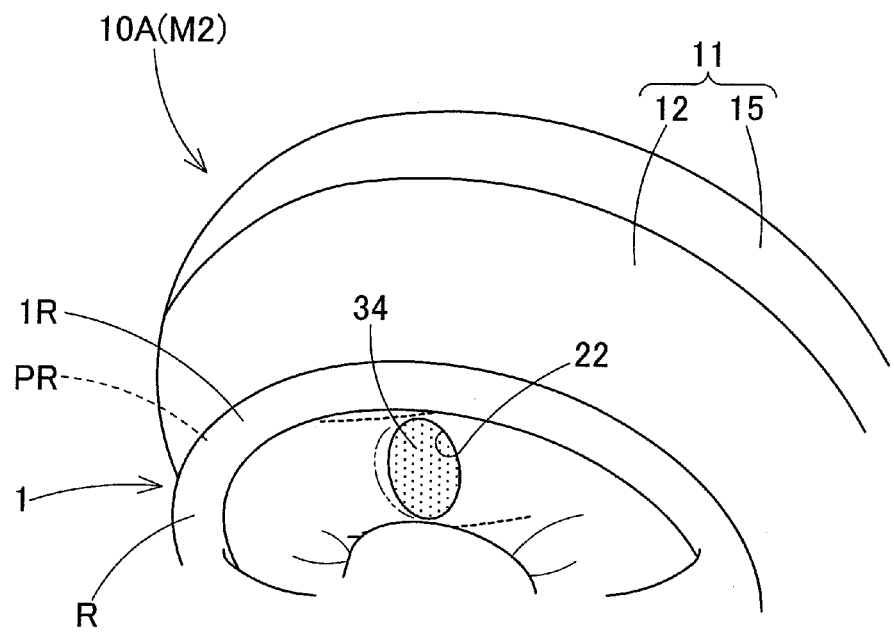
FIGS. 12A and 12B show by perspective views the way the vent hole is opened in the airbag of the second embodiment.
Figure 12B:
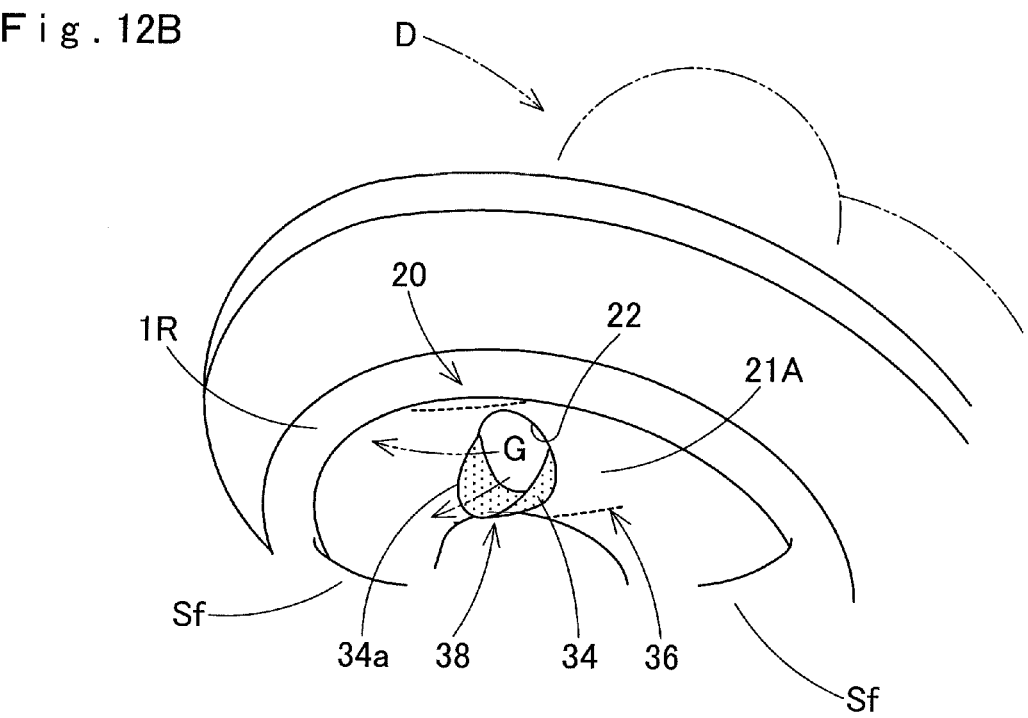
Figure 13:
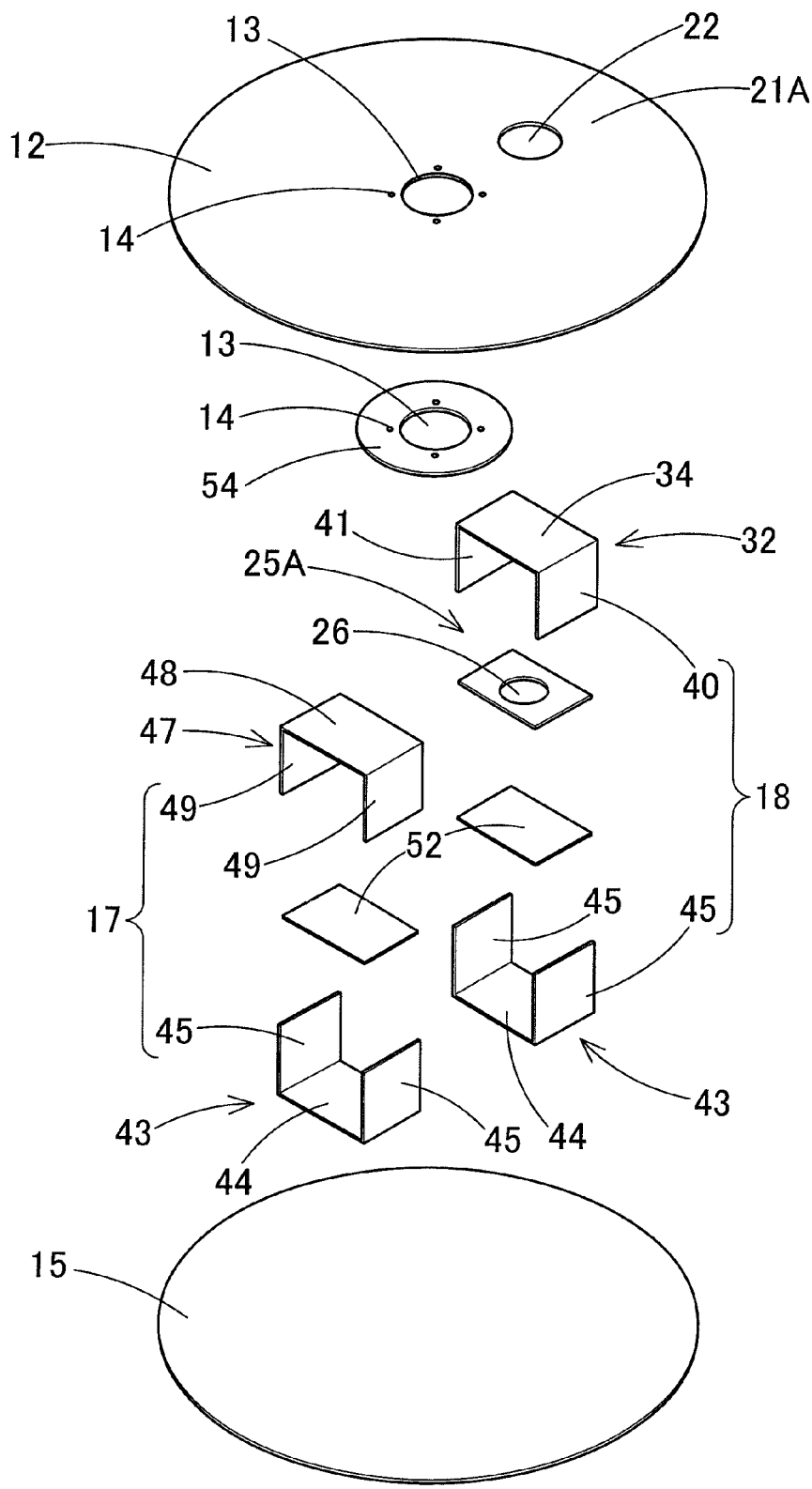
FIG. 13 depicts components of the airbag of the second embodiment by perspective views.

The tethers 17 are deployable on a rear side of the airbag 10 whereas the tethers 18 on a front side of the airbag 10, at full airbag deployment. The tethers 18 serve as part of a vent mechanism. As shown in FIGS. 3 and 8, the tethers 18 are symmetrical about a straight line connecting the inlet opening 13 and a later-described vent hole 22, as viewed from the side of the occupant side wall 15 at full inflation, in other words, symmetrical about a center line CL of the airbag 10 extending along a front and rear direction, including the width, the length between the walls 12 and 15, the locations connected to the walls 12 and 15, the angles against the walls 12 and 15, and so are the tethers 17.

Figure 5:
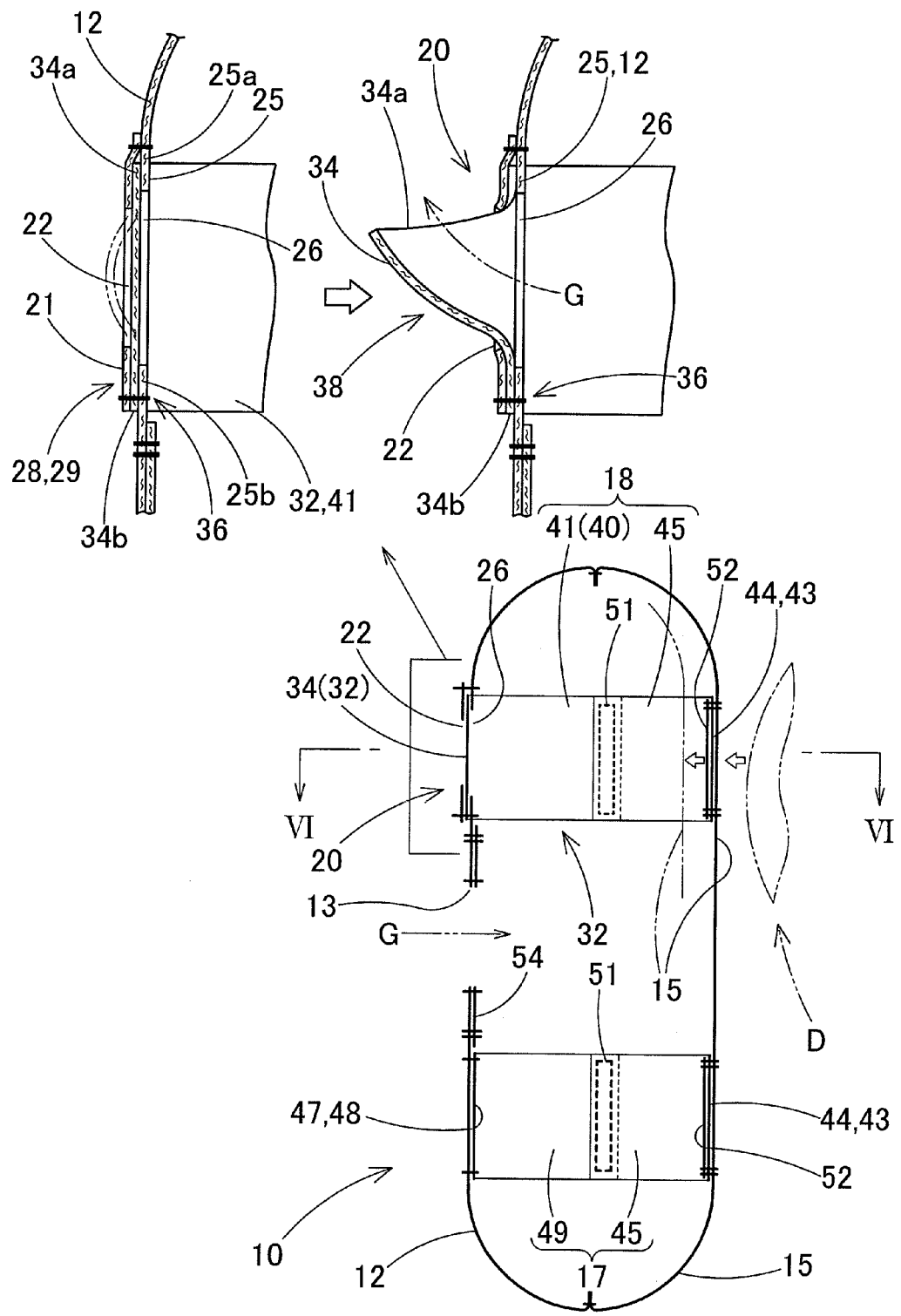
FIG. 5 is a vertical section of the airbag of FIG. 2 taken along line V-V in FIG. 4 and also shows the way a vent hole is opened.

As shown in FIGS. 5 and 8, the tethers 17 are comprised of an occupant side tether component 43 and a vehicle body side tether component 47, whereas the tether 18 comprised of a belt member 32 and an occupant side tether component 43.

Each of the occupant side tether components 43 is formed into a band and includes a joint portion 44 which has a rectangular plate shape and located at the center and two arms 45 extending from left and right sides of the joint portion 44. The vehicle body side tether component 47 is formed into a band and includes a joint portion 48 which has a rectangular plate shape and located at the center and two arms 49 extending from left and right sides of the joint portion 48. The belt member 32 is formed into a band and includes a cover portion 34 which has a rectangular plate shape and located at the center and connecting sections 40 and 41 extending from left and right sides of the cover portion 34.

Figure 6A:
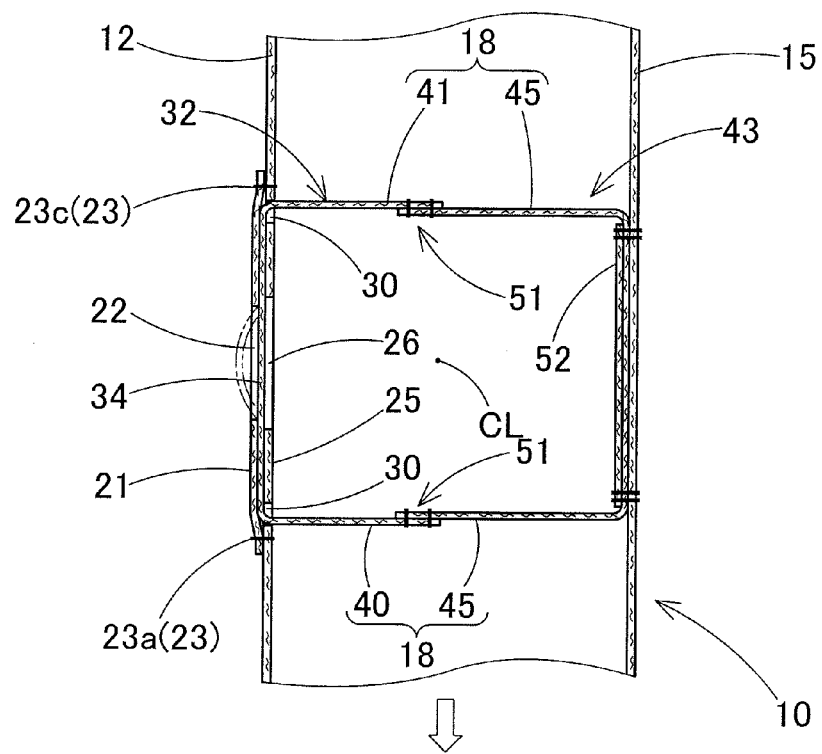
FIGS. 6A and 6B are partial sectional views of the airbag of FIG. 2 taken along line VI-VI in FIG. 5 and show the way the vent hole is opened.

To form the tethers 17, the joint portion 44 of the occupant side tether component 43 is firstly sewn to an inner surface of the rear area of the occupant side wall 15. In the meantime, the joint portion 48 of the vehicle body side tether component 47 is sewn to the inner surface of a rear area of the vehicle body side wall 12. Then each of the arms 45 of the occupant side tether component 43 and each of the arms 49 of the vehicle body side tether component 47 are sewn together with a stitch 51 as shown in FIGS. 5 and 6. Thus each of the tethers 17 are formed of the arms 45 and 49.

To form the tethers 18, the joint portion 44 of the occupant side tether component 43 is sewn to the inner surface of a front area of the occupant side wall 15. Then the cover portion 34 of the belt member 32 is let through a later-described guide section 28 formed proximate the vent hole 22 on the vehicle body side wall 12. Subsequently, each of the arms 45 of the occupant side tether component 43 and each of the connecting sections 40 and 41 of the belt member 32 are sewn together with a stitch 51. Thus each of the tethers 18 are formed of the arms 45 and connecting sections 40 and 41.

As shown in FIGS. 5 and 6, the joint portion 44 of each of the occupant side tether components 43 is sewn to the occupant side wall 15 together with a protecting cloth 52.

The components of the airbag 10: the protecting cloths 52, reinforcing cloth 54, belt member 32, occupant side tether component 43, vehicle body side tether component 47 and a later-described outer panel 21, are fabricated of a flexible woven fabric of such synthetic resin as polyamide or polyester, as well as the vehicle body side wall 12 and occupant side wall 12.

The airbag 10 of the airbag apparatus M1 according to the first embodiment includes a vent mechanism 20 that vents an inflation gas from a vent hole 22 when a driver or occupant bumps against the occupant side wall 15 at actuation of the airbag apparatus M1 and the occupant side wall 15 comes close to the vehicle body side wall 12, which is supported by a member of a vehicle, and an internal pressure of the airbag 10 exceeds a predetermined value.

Referring to FIGS. 4 to 8, the vent mechanism 20 includes an outer panel 21, an inner panel 25, a guide section 28 and the belt member 32 which includes the cover portion 34 for covering the vent hole 22. The outer panel 21 is located on an outer side of the cover portion 34, and the round vent hole 22 is formed on the outer panel 21. The inner panel 25 is located on an inner side of the cover portion 34 and is provided with a round inner opening 26 so an internal pressure of the airbag 10 works on the cover portion 34.

The inner opening 26 and the vent hole 22 are arranged in a concentric fashion with the cover portion 34 located there between.

The guide section 28 is so designed that the two connecting sections 40 and 41 are movable toward the vent hole 22 when the occupant side wall 15 catches an occupant and approximates the vehicle body side wall 12 such that the cover portion 34 loosens and opens the vent hole 22. Further, when the airbag 10 is inflated, the guide section 28 holds the connecting sections 40 and 41 so the connecting sections 40 and 41 serve as the tethers 18.

More particularly, in the first embodiment, the inner panel 25 is comprised of a part of the vehicle body side wall 12. The outer panel 21 is formed into a rectangular plate having the vent hole 22 located at the center, and is sewn to an outer peripheral edge of the inner panel 25 (i.e., to the vehicle body side wall 12) by the outer peripheral edge.

The guide section 28 includes on left and right sides of the inner opening 26 on the inner panel 25 (i.e., on the vehicle body side wall 12) each one slit or insert opening 30 extending along a front and rear direction. The guide section 28 is comprised of a tubular region 29 formed by the inner panel 25 and outer panel 21 between the two slits 30. The length L1 (FIG. 8) of each of the slits 30 is greater than a diameter D0 of the vent hole 22 and a diameter D1 of the inner opening 26 by a good margin, and is slightly greater than a width B1 of the belt member 32 such that the belt member 32 can be inserted through the slits 30 in a flattened state.

The cover portion 34 of the belt member 32 is located between the outer panel 21 and inner panel 25, and the connecting sections 40 and 41 are inserted through the slits 30 and protrude from left and right ends 29a and 29b of the tubular region 29.

The cover portion 34 is greater than the inner opening 26 in size so as to cover the vent hole 22 sufficiently. Further, the cover portion 34 is so sized that an outer edge 34a of the cover portion 34 passes through the vent hole 22 when the cover portion 34 receives an internal pressure of the airbag 10 via the inner opening 26 and the connecting sections 40 and 41 loosen.

Moreover, when the cover portion 34 is run through the slits 30 and allocated, the vent hole 22 is located at the center in a front and rear direction and in a left and right direction of the cover portion 34.

In the first embodiment, furthermore, a first edge in a width direction of the cover portion 34 (i.e., an outer edge located toward an outer periphery of the airbag 10) is connected neither to the outer panel 21 nor to the inner panel 25, whereas a second edge in a width direction (i.e., an inner edge located toward the inlet opening 13, i.e, toward the center of the airbag 10) is connected at least to the inner panel 25, as best shown in FIG. 5.

Figure 4:
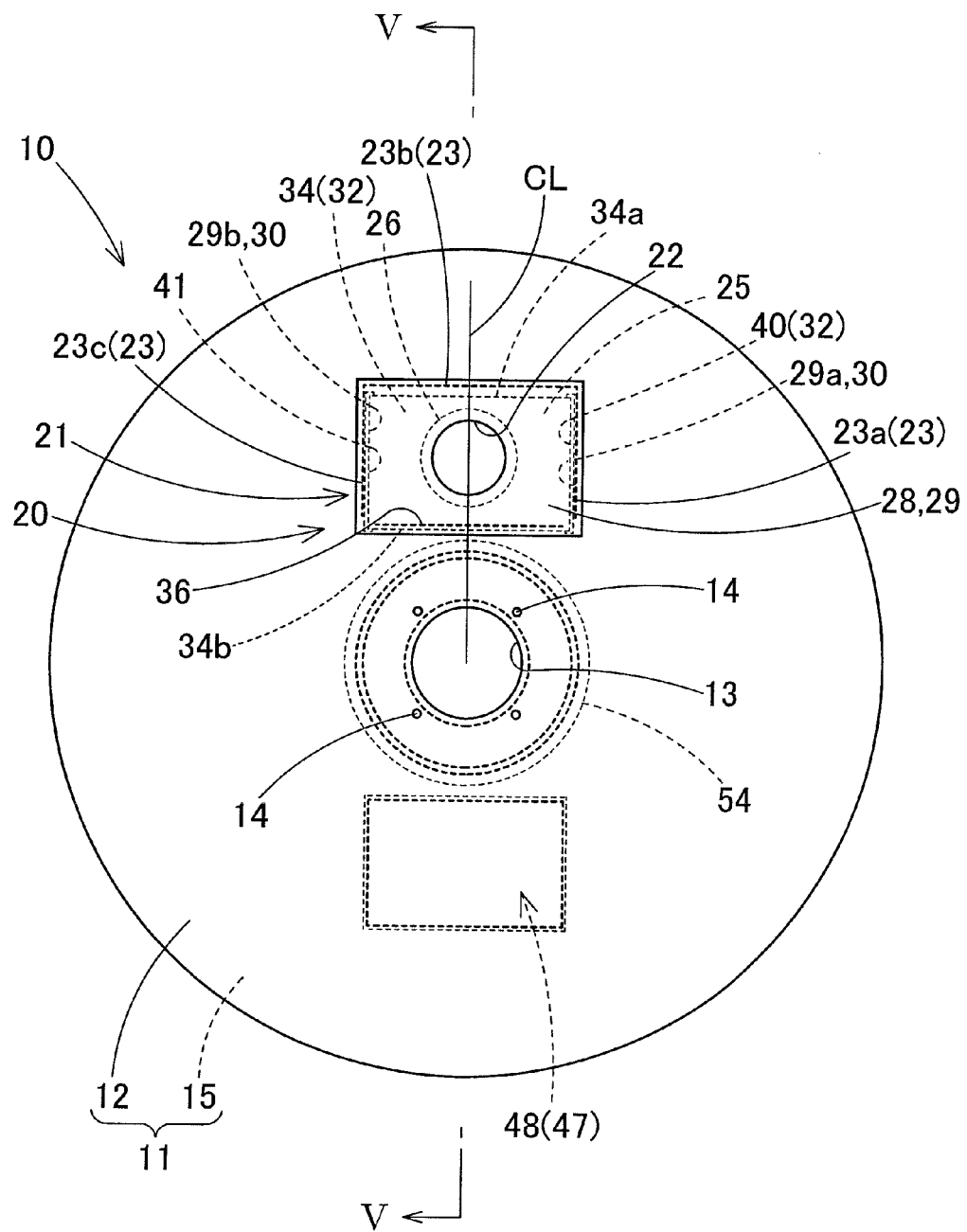
FIG. 4 is a bottom view of the airbag of FIG. 2.

In this specific embodiment, the inner edge or second edge 34b is connected not only to the vehicle body side wall 12 (i.e., to the inner panel 25), but also to the outer panel 21 with a straight stitch 36. Accordingly, as shown in FIGS. 4 to 6B, the rectangular outer panel 21 is connected to the vehicle body side wall 12 (inner panel 25) by an entire outer circumference, with the stitch 36 and a stitch 23 (23a, 23b and 23c) extending over its three sides and thus having a reverse U-shape. The stitch 23a and 23c are located away from the slits 30 and left and right ends of the stitch 36 so as not to touch the cover portion 34 as shown in FIG. 4.

As described above, the connecting sections 40 and 41 of the belt member 32 are respectively connected to the arms 45 of the occupant side tether components 43 which are joined to the occupant side wall 15, and constitute the tethers 18 that control a clearance between the vehicle body side wall 12 and occupant side wall 15 at airbag inflation, together with the arms 45. On the vehicle body side wall 12, the tethers 18 are held by the left and right ends 29a and 29b of the tubular region 29, which ends are comprised of peripheral edges of the slits 30, when they are in service.

Manufacturing of the airbag 10 is now described. Firstly, the reinforcing cloth 54 and the joint portion 48 of the vehicle body side tether component 47 are joined to predetermined locations of the inner surface of the vehicle body side wall 12, and then the inlet opening 13 and mounting holes 14 are formed. Subsequently, the inner opening 26 and slits 30 are formed on the location of the inner panel 25 on the vehicle body side wall 12. Thereafter, the belt member 32 is inserted firstly through one of the slits 30 and then through the other such that the cover portion 34 is located over the inner opening 26 on the outer surface of the vehicle body side wall 12. Then the outer panel 21 having the vent hole 22 is located on the cover portion 34 on the outer surface of the vehicle body side wall 12, and is joined to the inner panel 21 with the stitch 23 and 36. When the stitch 36 is made, the inner edge 34b of the cover portion 34 is sewn to the inner panel 25 together with the outer panel 21.

In the meantime, the joint portions 44 of the occupant side tether components 43 are joined to the front area and rear area on the inner surface of the occupant side wall 15, respectively, together with the protecting cloths 52.

Thereafter, the vehicle body side wall 12 and occupant side wall 15 are sewn together by the outer circumferential edges and the airbag 10 is then reversed inside out via the inlet opening 13. Subsequently, the arms 45, 49 and the connecting sections 40 and 41 are taken out of the inlet opening 13, and then the arms 45 and 49, and the arms 45 and connecting sections 40 and 41 are joined together, respectively. If then the stitches 51 are put back into the airbag 10 via the inlet opening 13, the airbag 10 is completed.

To assemble the airbag apparatus M1, the retainer 55 is housed inside the airbag 10 such that the bolts of the retainer 55 project out of the mounting holes 14, and then the airbag 10 is folded up. The airbag 10 is then wrapped up by a predetermined material for keeping the folded-up configuration. Then the airbag 10 is set on the bottom wall 59a of the case 59 such that the bolts of the retainer 55 protrude out of the through holes 59c. Subsequently, the inflator body 57a of the inflator 57 is set in the insert hole 59b of the bottom wall 59a from the lower side such that the bolts of the retainer 55 project through the flange 57c. If the bolts of the retainer 55 are fastened with unillustrated nuts, the airbag 10 and the inflator 57 are set in and secured to the case or housing 59, with the aid of the retainer 55. Thereafter, the airbag cover 63 is placed over the case 59 and the side wall 59d of the case 59 and the side wall 65 of the airbag cover 53 are joined together with the aid of rivets 61 or the like, thus the airbag cover 63 is mounted on the case 59. If then an unillustrated horn switch mechanism is attached to the mounting pieces 59e of the case 59, the airbag apparatus M1 is completed. Then unillustrated mounting bases of the horn switch mechanism are used to mount the airbag apparatus M1 on the steering wheel body 1, which has been secured to the steering shaft SS. Thus the airbag apparatus M1 is mounted on a vehicle.

When the airbag apparatus M1 is actuated and an inflation gas G is fed to the airbag 10 via the inlet opening 13, the airbag 10 inflates as shown in FIGS. 2 and 5, and pushes and opens the doors 64a of the airbag cover 63. Then the airbag 10 protrudes out of the case 59 and covers the top plane PR of the ring R, as indicated by double-dotted lines in FIG. 2.

When the occupant side wall 15 catches a driver or occupant D at airbag inflation and moves toward the vehicle body side wall 12, which is supported by the top plane PR of the ring R of the steering wheel body 1 (i.e., by a vehicle body member), the tethers 17 and the connecting sections 40 and 41 serving as the tethers 18 loosen. In the meantime, as shown in FIGS. 5 to 7B, the cover portion 34 receives an internal pressure of the airbag 10 through the inner opening 26 of the inner panel 25 and loosens outwardly in such a manner as to pass through the vent hole 22, and then slips out of a space between the inner opening 26 and vent hole 22, thereby opening the vent hole 22. Thus an inflation gas G is released from the vent hole 22.

Figure 6B:
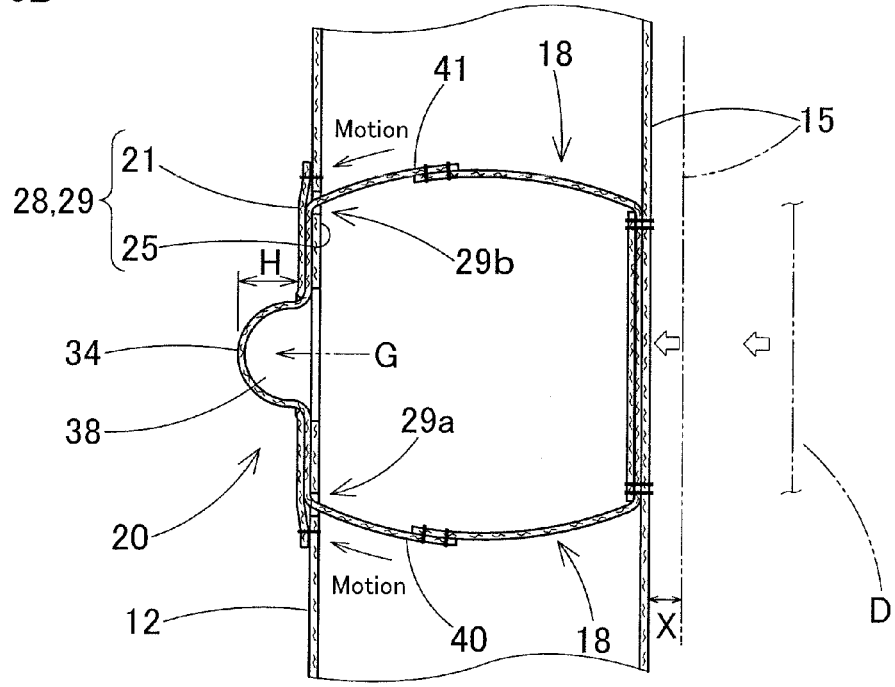

When the cover portion 34 passes through the vent hole 22, the two connecting sections 40 and 41, which extend from opposite sides of the cover portion 34 with the aid of the guide section 28 and are connected to the occupant side wall 15 with the aid of the arms 45, move toward the vent hole 22. That is, as shown in FIG. 6B, each of the two connecting sections 40 and 41 moves toward the vent hole 22 and runs through the guide section 28 for a distance X that the occupant side wall 15 comes close to the vehicle body side wall 12, and accordingly a height H that the cover portion 34 protrudes from the vent hole 22 is generally equal to the distance X, and which height is generally two times of that of a conventional airbag. As a result, the first embodiment will enable the vent hole 22 to open widely and release an inflation gas quickly, such that the airbag 10 will cushion and protect a driver with an adequately suppressed internal pressure.

Therefore, the airbag apparatus M1 according to the first embodiment will be capable of releasing an inflation gas G quickly despite of the configuration that the vent hole 22 is opened with the aid of loosening of the tethers 18.

In the first embodiment, moreover, the two connecting sections 40 and 41 are arranged symmetrical about the straight line CL that connects the vent hole 22 and the inlet opening 13 of the airbag 10 for introducing an inflation gas G, as viewed from the side of the occupant side wall 15 at full inflation of the airbag 10.

Figure 7A:
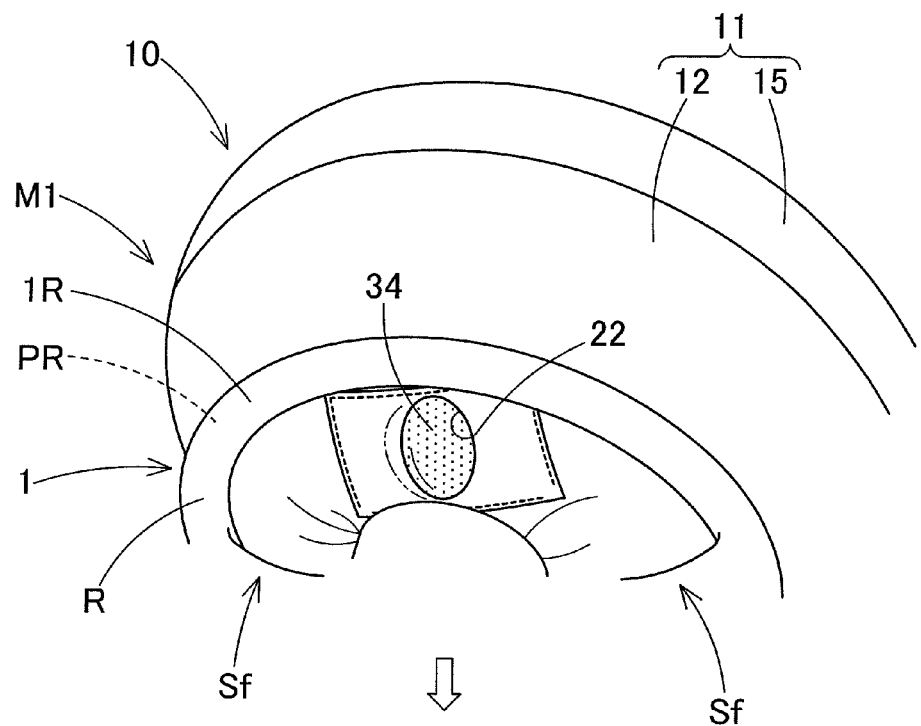
FIGS. 7A and 7B show by perspective views the way the vent hole is opened in the airbag of the first embodiment.
Figure 7B:
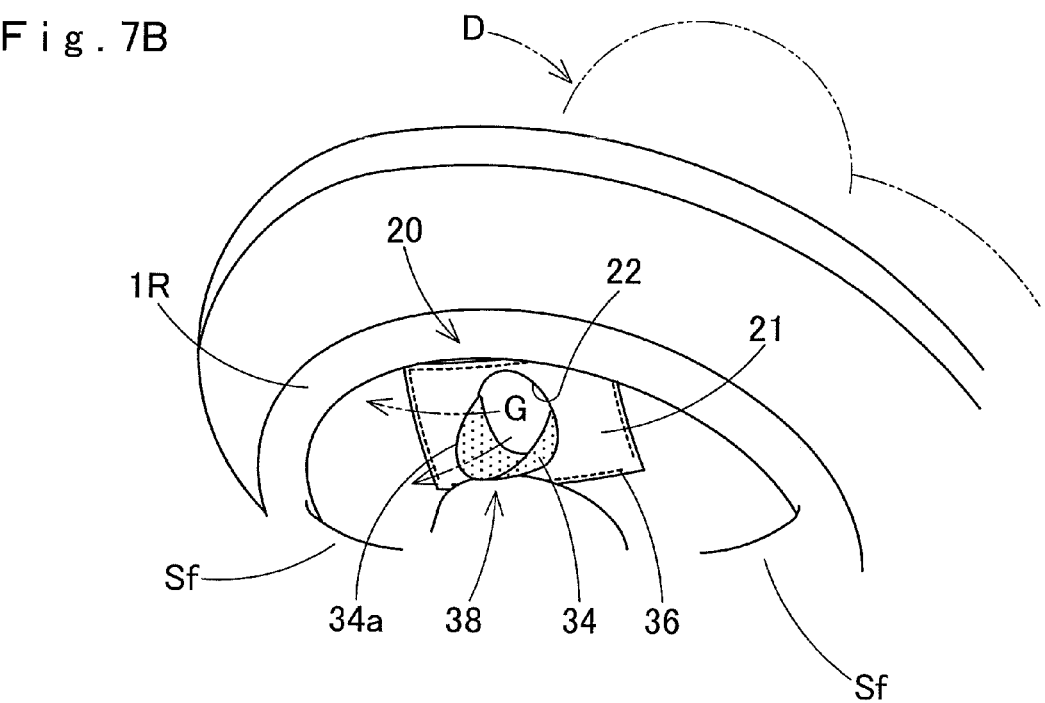

With this configuration, the two connecting sections 40 and 41 are arranged in a concentric fashion about the inlet opening 13, and equally distant from the inlet opening 13. Therefore, when the occupant side wall 15 catches an occupant and moves toward the vehicle body side wall 12, the two connecting sections 40 and 41 will loosen equally and the amounts that the connecting sections 40 and 41 move when the cover portion 34 passes through the vent hole 22 will be equal in a steady fashion. As a result, as shown in FIGS. 6B and 7, the vent hole 22 will be formed with a curve 38 that curves bilaterally symmetrically and this opening fashion of the vent hole 22 will be steady in every airbag 10.

In the first embodiment, furthermore, the first edge or outer edge 34a in a width direction of the cover portion 34 is connected neither to the outer panel 21 nor to the inner panel 25, whereas the second edge or inner edge 34b in a width direction of the cover portion 34 is connected at least to the inner panel 25 with the stitch 36.

With this configuration, a specific edge, i.e., the outer edge 34a, which is not connected to the inner panel 25, will pass through the vent hole 22 and open the vent hole 22, and therefore, the opening fashion of the vent hole 22 will be further stabilized.

Further, the configuration that the cover portion 34 is connected to the region of the inner panel 25 of the vehicle body side wall 12 by the other (i.e., the inner) edge 34b will help prevent the connecting sections 40 and 41 from slipping through the guide section 28 freely when the airbag 10 is folded up, which slipping would otherwise change substantial lengths of the connecting sections 40 and 41. Therefore, the configuration of the first embodiment will help stabilize the lengths of the connecting sections 40 and 41 projecting out of the guide section 28 and facilitate the folding work of the airbag 10 by fixing the location and posture of the belt member 32.

In the first embodiment, the first edge of the cover portion 34 which is not connected to the inner panel 25 and to pass through the vent hole 22 is the outer edge 34a that faces away from the inlet opening 13, in other words faces away from the inflator 57. With this configuration, as shown in FIG. 7, when the vent hole 22 is opened, the cover portion 34 will form a tapering half pipe with the curve 38, and the tapering half pipe will be located at a space between front spokes Sf inside the ring R, i.e., inside the front region 1R of the steering wheel body 1. Therefore, the vent hole 22 will exhaust an inflation gas G smoothly toward a large space in the front.

Furthermore, the inner panel 25 of the vent mechanism 20 is comprised of a part of the vehicle body side wall 12. The outer peripheral edge of the outer panel 21 of the vent mechanism 20 is connected to the outer peripheral edge of the inner panel 25 which is a part of the vehicle body side wall 12. The guide section 28 includes on the left and right sides of the inner opening 26 two slits 30, and is comprised of the tubular region 29 formed of the inner panel 25 and outer panel 21 between the two slits 30. Further, the cover portion 34 of the belt member 32 is located between the outer panel 21 and the inner panel 25 and the connecting sections 40 and 41 run through the slits 30, respectively, so as to protrude from left and right ends 29a and 29b of the tubular region 29.

This configuration will serve to reduce the number of components of the vent mechanism 20, because the inner panel 25 of the vent mechanism 20 is comprised of a part of the vehicle body side wall 12, which constitutes the circumferential wall 11 of the airbag 10, and the tubular region 29 serving as the guide section 28 is also formed by the two slits 30 formed on the vehicle body side wall 12.

Moreover, since the vent hole 22 is formed on the outer panel 21 that is prepared separate from the vehicle body side wall 12 or occupant side wall 15, the shape of the vent hole 22 can be easily changed without changing the inner opening 26 on the inner panel 25, i.e., on the vehicle body side wall 12. That is, a design change of the vent hole 22 will be easily handled by changing the outer panel 21, which is a small component.

Nevertheless, the outer panel on which the vent hole is to be formed may also be comprised of a part of the vehicle body side wall of the airbag, as in an airbag 10A of an airbag apparatus M2 according to the second embodiment of the invention.

Referring to FIGS. 9 to 13, the vent mechanism 20 of the airbag 10A is comprised of an outer panel 21A that is a part of the vehicle body side wall 12, and an inner panel 25A that has a rectangular plate shape and has a round inner opening 26 at the center. The inner panel 25A is connected to an inner surface of the vehicle body side wall 12.

Front and rear edges 25a and 25b of the inner panel 25A are joined to the vehicle body side wall 12. The front and rear edges 25a and 25b correspond to edges in a width direction of the cover portion 34. In the second embodiment, the guide section 28A is comprised of a tubular region 29A that is formed of the inner panel 25A and the outer panel 21A between the joints of the front and rear edges 25a and 25b of the inner panel 25A.

The belt member 32 is so arranged that the cover potion 34 is located between the outer panel 21A and inner panel 25A and the connecting sections 40 and 41 protrude out of left and right ends 29a and 29b of the tubular region 29A.

The airbag apparatus M2 according to the second embodiment is mounted on a steering wheel body and uses the same retainer, inflator, case, rivets and airbag cover as in the first embodiment.

With the second embodiment, when the occupant side wall 15 catches a driver or occupant at airbag inflation and moves toward the vehicle body side wall 12, which is supported by the top plane PR of the ring R of the steering wheel body 1 (i.e., by a vehicle body member), the tethers 17 and the connecting sections 40 and 41 serving as the tethers 18 loosen. Then as shown in FIGS. 10 to 12B, the cover portion 34 receives an internal pressure of the airbag 10A through the inner opening 26 of the inner panel 25A and loosens outwardly in such a manner as to pass through the vent hole 22, and then slips out of a space between the inner opening 26 and vent hole 22, thereby opening the vent hole 22. Thus an inflation gas G is released from the vent hole 22.

When the cover portion 34 passes through the vent hole 22, the two connecting sections 40 and 41, which extend from opposite sides of the cover portion 34 with the aid of the tubular region 29A serving as the guide section 28A and are connected to the occupant side wall 15 with the aid of the arms 45, move toward the vent hole 22 along with the cover portion 34. That is, each of the connecting sections 40 and 41 moves toward the vent hole 22 and runs through the tubular region 29A for a distance X that the occupant side wall 15 comes close to the vehicle body side wall 12, and accordingly a height H that the cover portion 34 protrudes from the vent hole 22 is generally equal to the distance X, and which height is generally two times of that of a conventional airbag. As a result, the second embodiment will also enable the vent hole 22 to open widely and release an inflation gas quickly, such that the airbag 10A will cushion and protect a driver with an adequately suppressed internal pressure.

Therefore, the airbag apparatus M2 according to the second embodiment will be capable of releasing an inflation gas G quickly despite of the configuration that the vent hole 22 is opened with the aid of loosening of the tethers 18.

In the second embodiment, moreover, since the outer panel 21A of the vent mechanism 20 is comprised of a part of the vehicle body side wall 12, which constitutes the circumferential wall 11 of the airbag 10A, and the tubular region 29A serving as the guide section 28A is formed by only connecting the opposite edges 25a and 25b of the inner panel 25A to the vehicle body side wall 12. Therefore, the vent mechanism 20 will be formed simply with reduced number of components.

Also in the second embodiment, the two connecting sections 40 and 41 are arranged symmetrical about a straight line CL that connects the vent hole 22 and the inlet opening 13 of the airbag 10A, as viewed from the side of the occupant side wall 15 at full inflation of the airbag 10A. As in the first embodiment, with this configuration, the two connecting sections 40 and 41 are arranged in a concentric fashion about the inlet opening 13, and equally distant from the inlet opening 13. Therefore, when the occupant side wall 15 catches an occupant and moves toward the vehicle body side wall 12, the connecting sections 40 and 41 loosen equally and the amounts that the connecting sections 40 and 41 move when the cover portion 34 passes through the vent hole 22 are equal in a steady fashion. As a result, the vent hole 22 will be formed with a curve 38 that curves bilaterally symmetrically and this opening fashion of the vent hole 22 will be steady in every airbag 10A.

Furthermore, the first edge or outer edge 34a in a width direction of the cover portion 34 is connected neither to the outer panel 21A nor to the inner panel 25A, whereas the second edge or inner edge 34b in a width direction of the cover portion 34 is connected at least to the inner panel 25A with a stitch 36. In the second embodiment, the stitch 36 sews the inner edge 34b of the cover portion 34 as well as the rear edge 25b of the inner panel 25A together to the outer panel 21A.

With this configuration, similarly to the first embodiment, a specific edge, i.e., the outer edge 34a, which is not connected to the inner panel 25A, will pass through the vent hole and open the vent hole 22, and therefore, the opening fashion of the vent hole 22 will be stabilized.

Further, the configuration that the cover portion 34 is connected to the vehicle body side wall 12 via the region of the inner panel 25A by the second edge 34b will help prevent the connecting sections 40 and 41 from slipping through the guide section 28A freely when the airbag 10A is folded up, which slipping would change substantial lengths of the connecting sections 40 and 41. Therefore, this configuration will help stabilize the lengths of the connecting sections 40 and 41 projecting out of the guide section 28A and facilitate the folding work of the airbag 10A by fixing the location and posture of the belt member 32.

Figure 16:
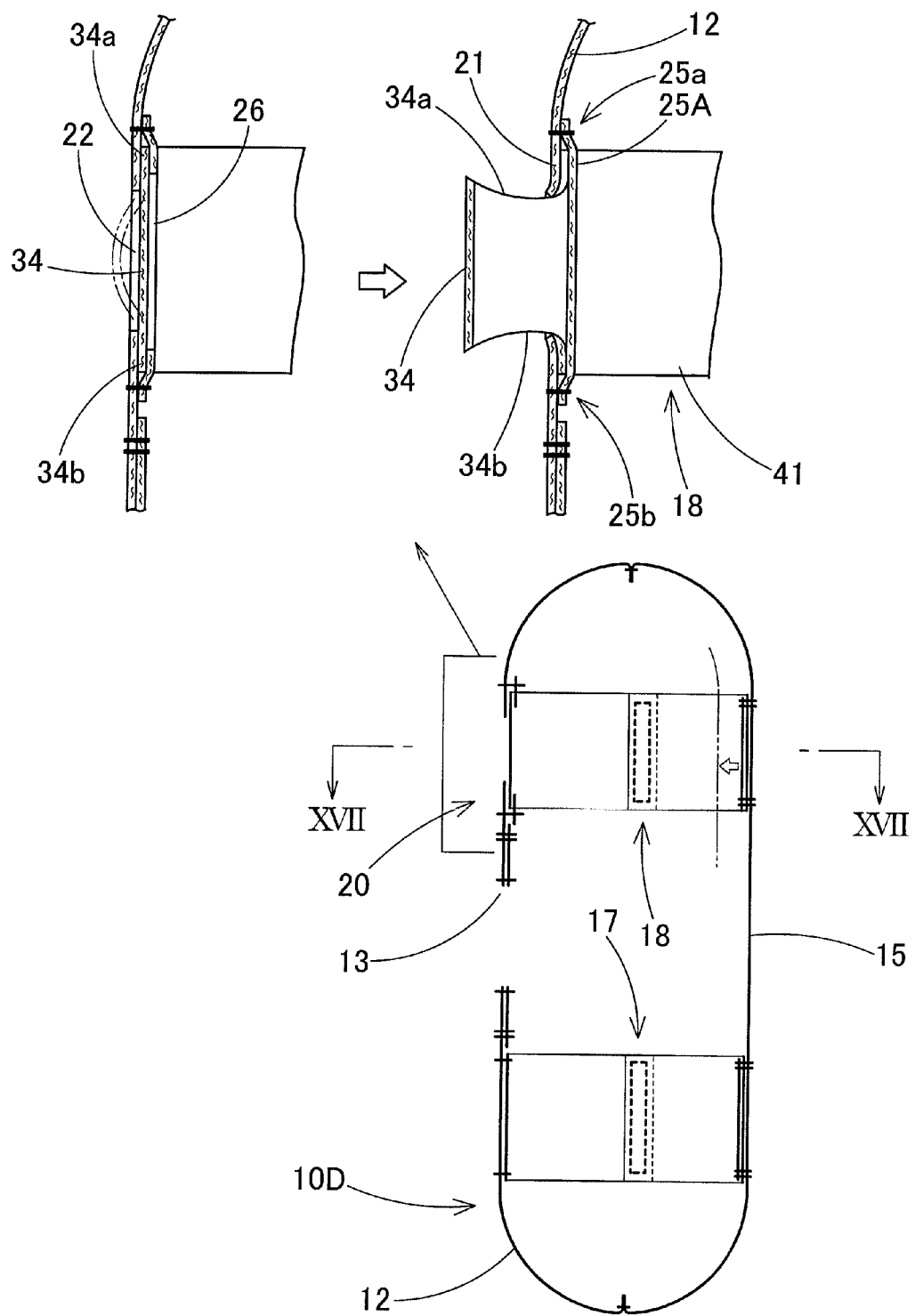
FIG. 16 is a vertical section of a modification of the airbag of the second embodiment and also shows the way a vent hole is opened.
Figure 17A:
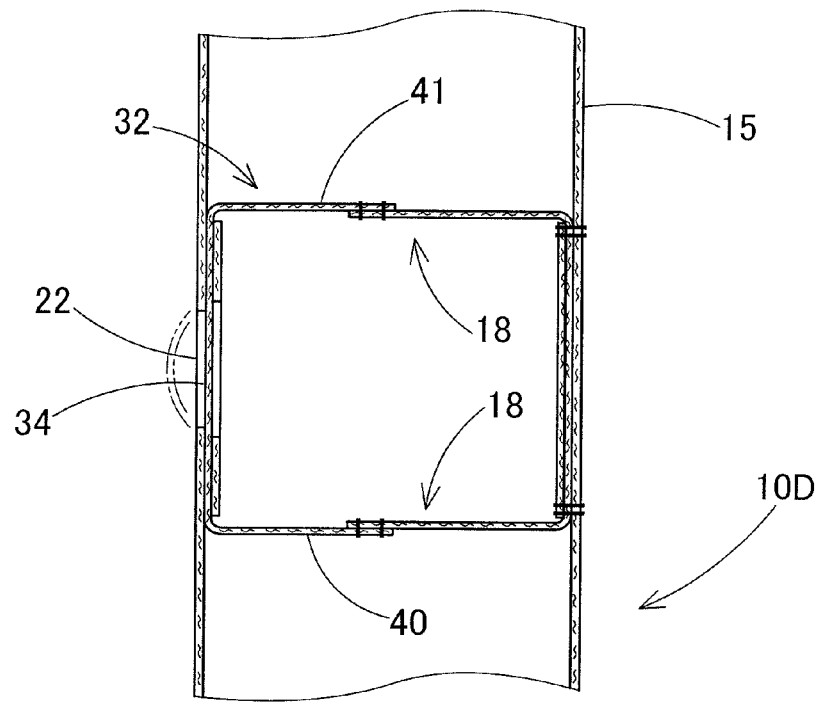
FIGS. 17A and 17B are partial sectional views of the airbag taken along line XVII-XVII in FIG. 16 and show the way the vent hole is opened.
Figure 17B:
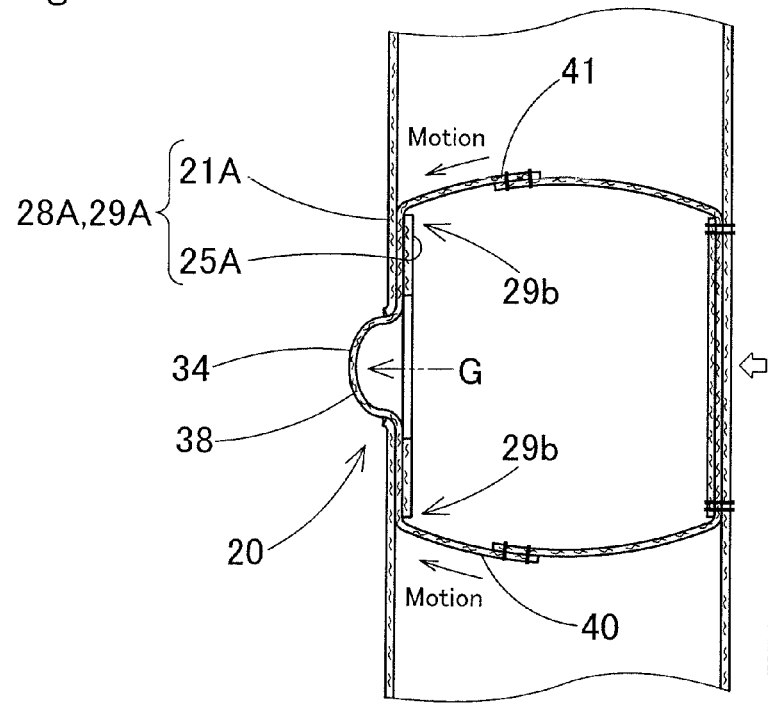

If such an advantage does not have to be considered, the cover portion 34 may be free from the inner panel 25A and outer panel 21A. FIGS. 16 and 17 depict a modification of the second embodiment, an airbag 10D. In the airbag 10D, both inner and outer edges 34b and 34a of the cover portion 34 are not connected to the inner panel 25A or to the outer panel 21A.

Figure 14:
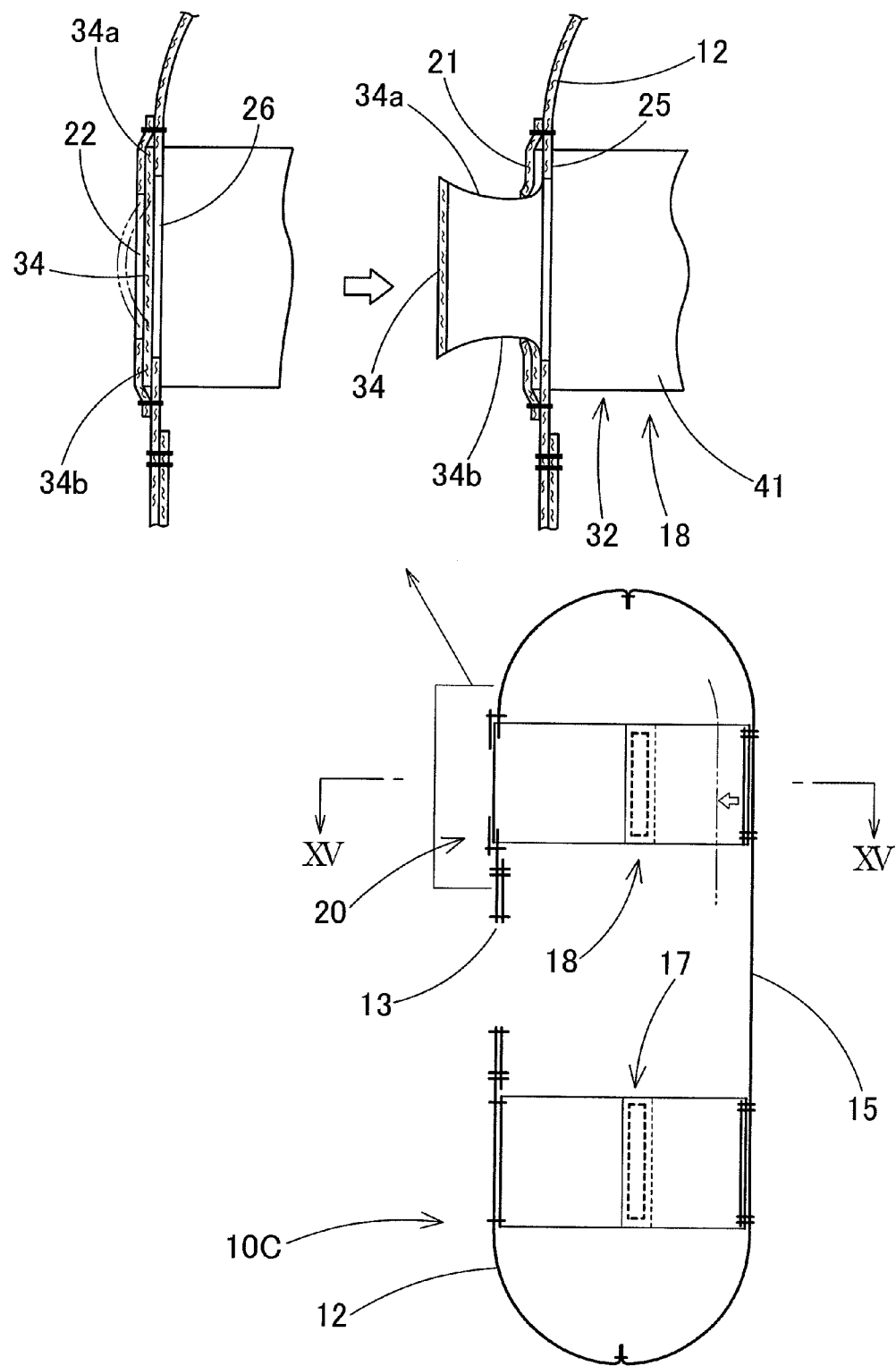
FIG. 14 is a vertical section of a modification of the airbag of the first embodiment and also shows the way a vent hole is opened.
Figure 15A:
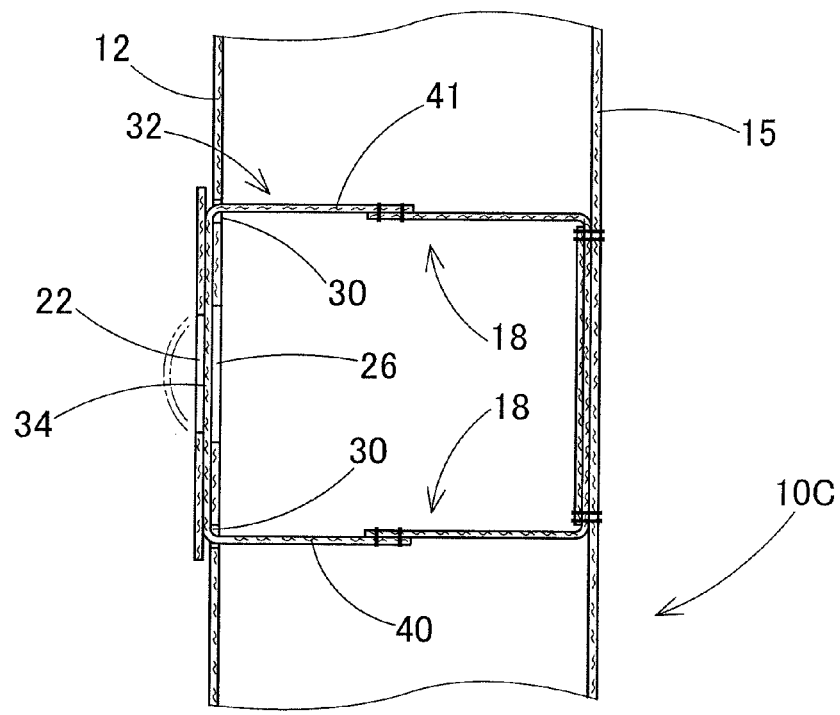
FIGS. 15A and 15B are partial sectional views of the airbag taken along line XV-XV in FIG. 14 and show the way the vent hole is opened.
Figure 15B:
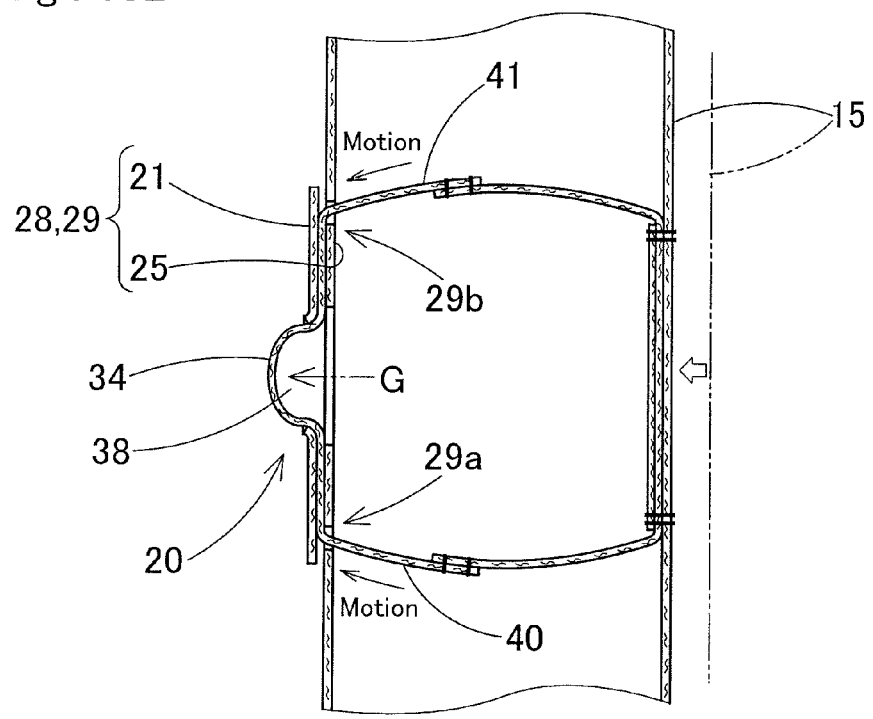

FIGS. 14 and 15 depict an airbag 10C, a similar modification of the first embodiment. The inner edge 34b of the cover portion 34 of the airbag 10C is not connected to the inner panel 25 or the outer panel 21, as well as the outer edge 34a.

In the airbag 10A of the second embodiment, the both edges 25a and 25b of the inner panel 25A are joined to an inner surface of the outer panel 21A (i.e., the vehicle body side wall 12), and the belt member 32 is run through the tubular region 29A (i.e., the guide section 28A) and the inner edge 34b of the cover portion 34 is connected to the inner panel 25A. In manufacturing such an airbag 10A, the belt member 32, and then the inner panel 25A are placed on the inner surface of the vehicle body side wall 12. If then the edge 25a, and the other edge 25b of the inner panel 25A are sewn to the vehicle body side wall 12 together with the inner edge 34b of the of the cover portion 34, the tubular region 29A is formed at the same time as the cover portion 34 is run through the tubular region 29A.

Figure 18:
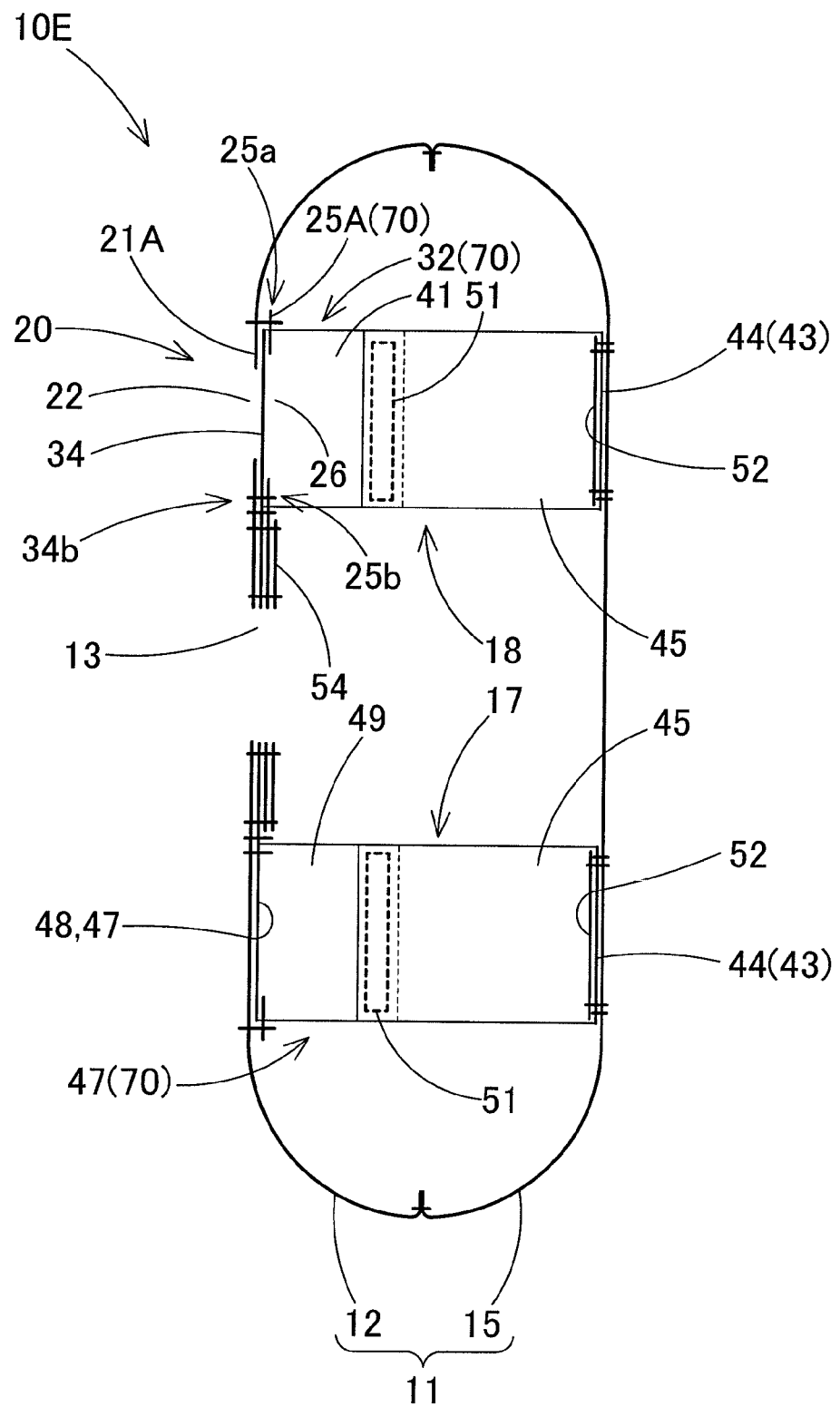
FIG. 18 is a vertical section of a further modification of the airbag of the second embodiment.
Figure 19:
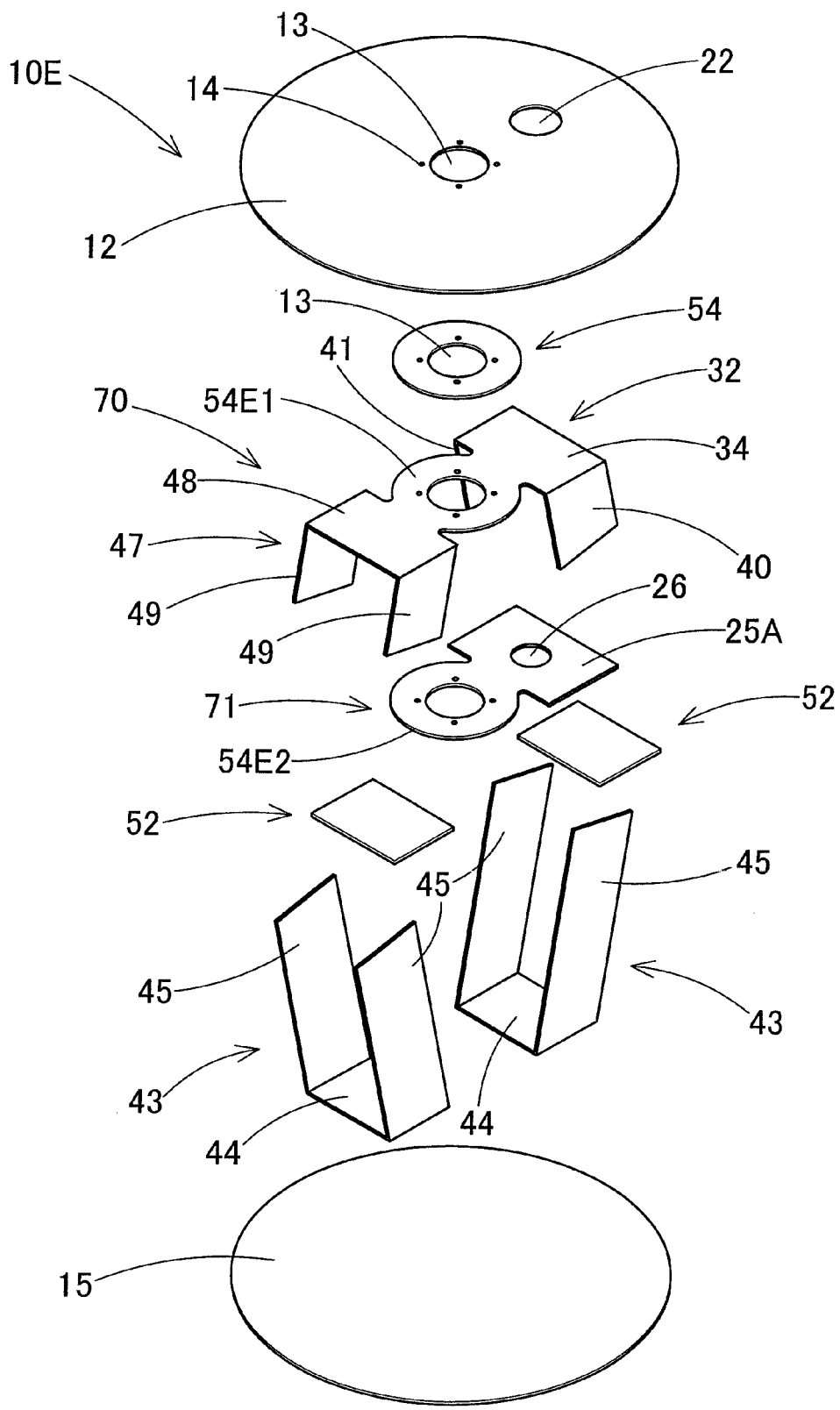
FIG. 19 schematically depicts components of the airbag of FIG. 18 by perspective views.

FIGS. 18 and 19 depict an airbag 10E, a further alternative embodiment. The airbag 10E includes an internal member 70 that is an all-in-one member in which a belt member 32, a second reinforcing cloth 54E1 to be located in a periphery of the inlet opening 13 and a vehicle body side tether component 47 are integrated. The internal member 70 is joined (by way of example, sewn) to an inner surface of the vehicle body side wall 12 by a predetermined region. In the illustrated embodiment, a second internal member 71, in which an inner panel 25A and a third reinforcing cloth 54E2 are integrated, is also provided.

To manufacture the airbag 10E, the internal member 70, the second internal member 71 having an inner opening 26 and then the reinforcing cloth 54 are overlaid on the vehicle body side wall 12 provided with a vent hole 22. Then the reinforcing cloth 54 and regions of the second and third reinforcing cloths 54E1 and 54E2 are sewn to the vehicle body side wall 12, and the front edge 25a, and the rear edge 25b of the inner panel 25A together with the inner edge 34b of the cover portion 34 are sewn to the vehicle body side wall 12 (i.e., to the outer panel 21A). Thereafter, an inlet opening 13 and mounting holes 14 are punched out.

In the meantime, joint portions 44 of occupant side tether components 43 are joined to a front area and a rear area on the inner surface of the occupant side wall 15, respectively, together with protecting cloths 52.

Thereafter, the vehicle body side wall 12 and occupant side wall 15 are sewn together by the outer circumferential edges and the airbag is then reversed inside out via the inlet opening 13. Subsequently, arms 45, 49 and connecting sections 40 and 41 are taken out of the inlet opening 13, and then the arms 45 and 49, and the arms 45 and connecting sections 40 and 41 are joined together, respectively. If then stitches 51 are put back into the airbag 10E via the inlet opening 13, the airbag 10E is completed.

With the airbag 10E, the same operation and effects as the second embodiment will be obtained. Further, the all-in-one structure of the internal member 70 including the belt member 32, the reinforcing cloth 54 and the vehicle body side tether component 47 will facilitate parts control.

Figure 20:
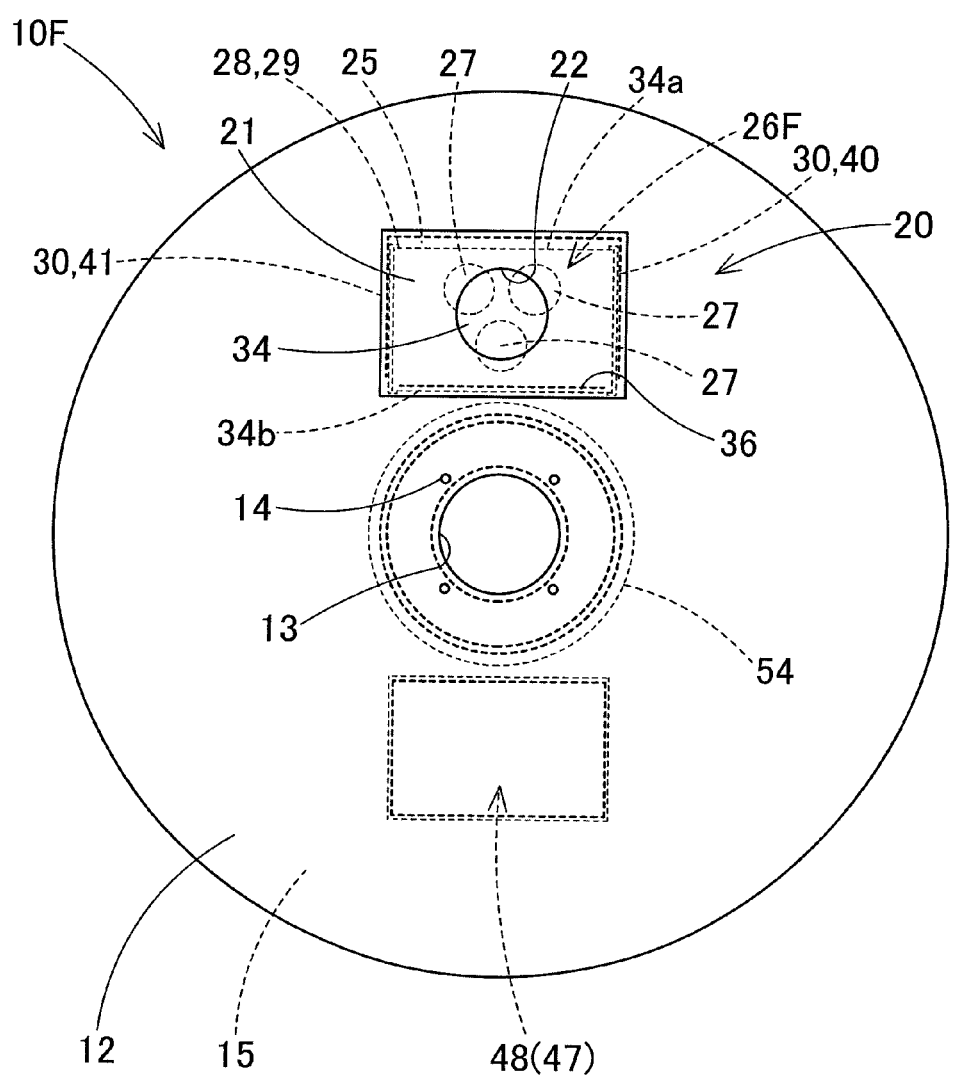
FIG. 20 is a bottom view of a further modification of the airbag of the first embodiment.
Figure 21:
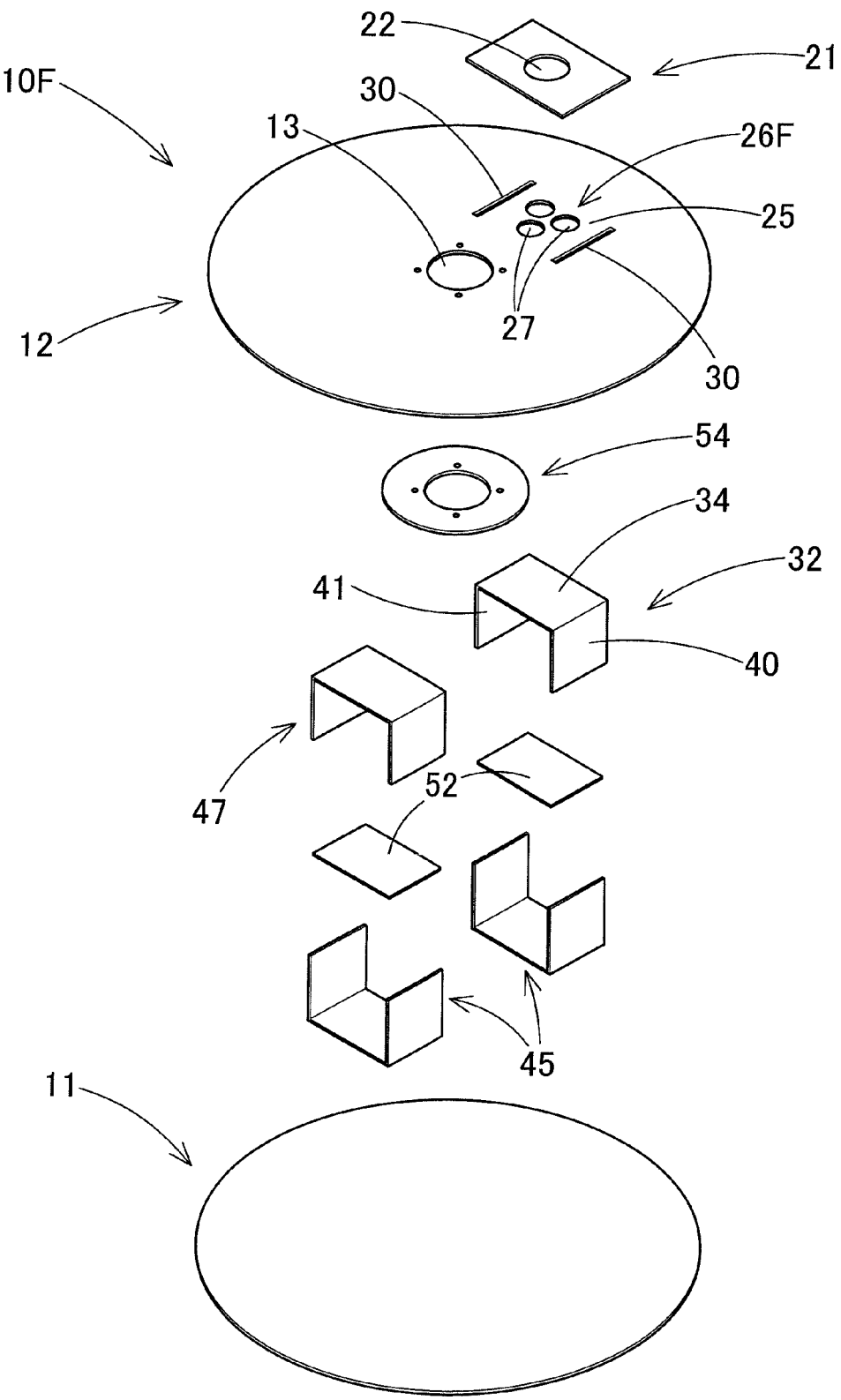
FIG. 21 schematically depicts components of the airbag of FIG. 20 by perspective views.

Although the inner panel 25/25A of the foregoing embodiments has only one inner opening 26, the inner opening may be comprised of more than one through holes 27, as in an airbag 10F shown in FIGS. 20 and 21. Although the illustrated embodiment has three through holes 27, the number of the through holes 27 may be two, four or more.

With this configuration, the flow rate and speed of an inflation gas G exhausted from the vent hole 22 will be adjustable by changing the number and/or the opening area of the through holes 27 of the inner opening 26F, without changing the contour of the vent hole 22, thereby giving more flexibility to pressure control of the airbag 10F at cushioning an occupant.

By way of example, if the inner opening 26F has the same opening area as the inner opening 26 but is comprised of a plurality of through holes 27, the inner opening 26F will cause a flow resistance and suppress the flow amount of an inflation gas G when the vent hole 22 is opened.

Although the foregoing embodiments have been described as applied to an airbag apparatus for protecting a driver, the present invention can also be applied to a front passenger airbag apparatus, a knee protection airbag apparatus and the like, as long as the apparatus includes inside the airbag a tether that loosens and helps regulate an internal pressure of the airbag when an occupant side wall catches (or cushions) an occupant and moves toward a vehicle body side wall.

What is claimed is:

1. An airbag apparatus adapted to be mounted on a vehicle, comprising:
    an airbag that is inflatable so as to separate a vehicle body side wall which is deployable toward a vehicle body structure and an occupant side wall which is deployable toward an occupant;
    a vent hole that is formed on the vehicle body side wall of the airbag;
    a belt member including:
    a cover portion that covers the vent hole in an openable fashion; and
    two connecting sections that extend from opposite sides of the cover portion in a continuous fashion and are connected to the occupant side wall in order to function as tethers that control a clearance between a vicinity of the vent hole and joints of the connecting sections to the occupant side wall at airbag inflation;
    an outer panel that is located on an outer side of the cover portion and provided with the vent hole;
    an inner panel that is located on an inner side of the cover portion and provided with an inner opening which allows an internal pressure of the airbag to act on the cover portion therethrough;
    a guide section which the two connecting sections run through in a movable fashion toward the vent hole in order to allow the cover portion to loosen and open the vent hole so an inflation gas is released when the occupant side wall catches an occupant and moves toward the vehicle body side wall, the guide section holding the two connecting sections such that the connecting sections function as the tethers at airbag inflation; and
    a vent mechanism that opens the vent hole so an inflation gas is released, and provided with the belt member, the outer panel, the inner panel, and the guide section,
    wherein the two connecting sections are arranged symmetrical about a straight line that connects the vent hole and an inlet opening of the airbag for introducing an inflation gas, as viewed from the side of the occupant side wall at full inflation of the airbag,
    wherein a first edge in a width direction of the cover portion is connected neither to the outer panel nor to the inner panel, whereas a second edge in a width direction of the cover portion is connected at least to the inner panel,
    wherein:
    the outer panel is comprised of a part of the vehicle body side wall;
    the inner panel is connected to an inner surface of the vehicle body side wall;
    opposite edges of the inner panel in a width direction of the cover portion are joined to the vehicle body side wall, and the guide section is comprised of a tubular region formed by the inner panel and the outer panel between joints of the opposite edges of the inner panel to the vehicle body side wall; and
    the cover portion of the belt member is located between the outer panel and the inner panel such that the two connecting sections protrude out of opposite ends of the tubular region.

2. The airbag apparatus of claim 1, wherein:
    the airbag apparatus is adapted to be mounted on a steering wheel for protecting a driver;
    each of the vehicle body side wall and the occupant side wall of the airbag has a generally round shape and the inlet opening is located at a center of the vehicle body side wall;
    the vent hole is so allocated as to be deployable in front of the inlet opening and in a space between an annular ring of the steering wheel and a boss located at a center of the steering wheel;
    the connecting sections are so allocated as to be deployable on the left and right sides of the cover portion; and
    an outer edge of the cover portion, which is deployable on a front side in a width direction of the cover portion at airbag deployment, is connected neither to the outer panel nor to the inner panel, whereas an inner edge of the cover portion, which is deployable on a rear side in a width direction of the cover portion, is connected at least to the inner panel.

* * * * *